US009395921B2

(12) United States Patent
Lu

(10) Patent No.: US 9,395,921 B2
(45) Date of Patent: Jul. 19, 2016

(54) WRITING DATA USING DMA BY SPECIFYING A BUFFER ADDRESS AND A FLASH MEMORY ADDRESS

(71) Applicant: MEMBLAZE TECHNOLOGY (BEIJING) CO., LTD., Beijing (CN)

(72) Inventor: Xiangfeng Lu, Beijing (CN)

(73) Assignee: MEMBLAZE TECHNOLOGY (BEIJING) CO., LTD., Beijing (CN)

( * ) Notice: Subject to any disclaimer, the term of this patent is extended or adjusted under 35 U.S.C. 154(b) by 77 days.

(21) Appl. No.: 14/400,467

(22) PCT Filed: May 11, 2013

(86) PCT No.: PCT/CN2013/075524
§ 371 (c)(1),
(2) Date: Nov. 11, 2014

(87) PCT Pub. No.: WO2013/170731
PCT Pub. Date: Nov. 21, 2013

(65) Prior Publication Data
US 2015/0143031 A1  May 21, 2015

(30) Foreign Application Priority Data

May 12, 2012 (CN) .......................... 2012 1 0150077

(51) Int. Cl.
*G06F 3/06* (2006.01)
*G06F 12/10* (2016.01)
*G06F 13/28* (2006.01)
(52) U.S. Cl.
CPC ............ *G06F 3/0613* (2013.01); *G06F 3/0659* (2013.01); *G06F 3/0679* (2013.01); *G06F 12/1081* (2013.01); *G06F 13/28* (2013.01)
(58) Field of Classification Search
CPC .... G06F 3/0659; G06F 12/1081; G06F 13/28
See application file for complete search history.

(56) References Cited

U.S. PATENT DOCUMENTS 7,380,115 B2    5/2008  Maine
7,620,748 B1 *  11/2009 Bruce ................. G06F 13/28
                                                710/22

(Continued)

FOREIGN PATENT DOCUMENTS

CN        1794214 A     6/2006
CN      101221544 A     7/2008
CN      101963891 A     2/2011

(Continued)

OTHER PUBLICATIONS

International Search Report for corresponding International Application No. PCT/CN2013/075524, mailed Aug. 22, 2013 (5 pages).

*Primary Examiner* — Hal Schnee
(74) *Attorney, Agent, or Firm* — Osha Liang LLP

(57) ABSTRACT

A storage device includes a buffer memory and a flash memory, which can be connected with the host computer communicably. A method for writing data into the storage device includes: receiving a first write command from the host, the first write command including the data to be written, the address for the flash memory and the address or the buffer memory; based on the address for the buffer memory, writing the data to be written to the buffer memory; based on the address for the flash memory, writing the data to be written to the flash memory.

19 Claims, 14 Drawing Sheets

(56) References Cited

U.S. PATENT DOCUMENTS

2012/0166909 A1* 6/2012 Schmisseur ......... G06F 11/1076
714/758
2012/0198174 A1* 8/2012 Nellans ............... G06F 12/0804
711/133

FOREIGN PATENT DOCUMENTS

| CN | 102043689 A | 5/2011 |
| CN | 102681952 A | 9/2012 |

* cited by examiner

WRITING DATA USING DMA BY SPECIFYING A BUFFER ADDRESS AND A FLASH MEMORY ADDRESS

CROSS REFERENCE TO RELATED APPLICATIONS

This is a national stage application based on PCT/CN2013/075524, filed on May 11, 2013, which claims priority to Chinese Patent Application No. CN 201210150077.8, filed on May 12, 2012. This application claims the benefits and priority of these prior applications and incorporates their disclosures by reference in their entireties.

TECHNICAL FIELD

The invention involves Solid Storage Device (SSD), more specifically, the invention involves the method and device for writing data to the random access memory of the solid storage devices.

BACKGROUND ART

Similar to the mechanical hard disk, solid storage device (SSD) is a large capacity, non-volatile storage device used for computer system. Solid storage device in general uses Flash as storage medium. In Chinese patent documents CN102043689A the solid storage device as shown in FIG. 13 is disclosed. FIG. 13 shows the function block diagram of the general present solid storage devices, including the host system 1301 and solid storage device 1302. Thereinto, the solid storage device 1302 includes the interface module 1303, solid storage processor 1304, as well as Flash array 1306 consisting of Flash chip 1305 as a unit. Among them, the interface module 1303 is mainly used for implementing the interface protocol consistent with the host system, such as SATA (Serial Advanced Technology Attachment), USB (Universal Serial Bus), PCIE (Peripheral Component Interconnect Express), SCSI (Small ComputerSystem Interface), IDE (Integrated Drive Electronics) etc. Through the interface module 1303, the solid storage device shows the host system a standard storage device with certain logic space. Solid storage processor 1304 is the control core of the whole storage device, which is mainly in charge of the control signals and data transmission between the interface module 1303 and flash array 1306, Flash management, conversion or mapping from the host logical address to Flash physical address, wear-leveling (the logical addresses are mapped to different physical addresses so as to prevent a single Flash chip from being concentratedly operated and disabled early), bad block management and so on. Solid storage processor 1304 can be implemented by a variety of software, hardware, firmware or their combination. 1305 is the individual Flash chip, and Flash array 1306 is consisting of a plurality of Flash chip 1305.

in order to improve the reading and writing speed of the solid storage device, random access memories such as DRAM or SRAM or other types of high speed reading/writing memories can be set up in the solid storage device, serving as cache memory when reading and writing data from the Flash. In the process of the storage device access, as an example, the computer sends SCSI (small computer system interface) command to the storage device, and the storage device receives and processes the SCSI command, executing corresponding storage medium reading and writing process according to the operation that the SCSI command indicates. In this process, the SCSI command does not directly operate the high speed buffer memory. That means, the cache memory is "transparent" to the computer or user. There are also some storage devices providing cache memory "flushing" mechanism, which means the computer or user can use a predetermined command to force the storage device to write the data in the cache memory to the non-volatile storage medium (for example, a disk or flash memory).

However, allocation and management of the cache memory will become the burden of the controller on the solid storage device. And when the cache memory is fully occupied, if the solid storage device receives new access request from the host system, it also needs to perform replace operations on the cache memory. Thus not only the complexity of the controller is increased, but also the host will experience bump on read/write performance over.

DMA (Direct Memory Access) transmission can also be executed between the host and the device. Method and device for executing DMA transmission is disclosed in the Chinese patent documents CN101221544A. A typical procedure of DMA transmission is Scatter/Gather operation. In the scatter/gather operation, a plurality of data blocks to be transmitted is stored at multiple discontinuous address location in the system (host) memory. The processor does not need to provide programming operation to the DMA controller for each data block being moved from a source to a destination, but just sets up descriptor table or the descriptor linked table in the system memory. Descriptor table or the descriptor linked table comprises a set of descriptors, each of which describes the data block's moving direction, source address, destination address and optional number of bytes transmitted. In the case not including number of bytes transmitted in a descriptor, the agreed length data can be transmitted through the DMA mode.

SUMMARY OF THE INVENTION

Thus, offloading the burden of work on the storage device controller is beneficial. By transferring the maintenance work related to the buffer memory of the storage device to the host, not only the storage device controller is offloaded, but also the host is provided the ability to control the storage device more flexibly.

In an embodiment of the invention, it provides a method for writing data to the storage device, which includes a buffer memory and a flash memory, and can be connected with the information processing device communicably, wherein the method comprises the followings:

a first DMA descriptor is received from the information processing device, wherein the first DMA descriptor includes addresses used for the information processing device, addressed used for the flash memory and addresses used for the buffer memory;

When the first DMA descriptor indicates the DMA write operations, basing on the address for the information processing device and the address for the buffer memory, a first data is written to the buffer memory from the information processing device by DMA transmission;

Basing on the address used for the flash memory and the address for the buffer memory, the first data in the buffer memory is written to the flash memory.

According to the first embodiment of the invention, wherein the first DMA descriptor includes the first DMA descriptor command and the first DMA descriptor data, the first DMA descriptor data includes the addresses used for the information processing device and the buffer memory, and the DMA command includes the addresses used for the flash memory; the method also includes:

The first DMA descriptor data will be converted to a first DMA microinstruction, which will be indicating the address used for the flash memory, the address for the information processing device as well as the address for the buffer memory;

wherein, when the first DMA descriptor indicates the DMA write operations, basing on the address for the information processing device and the address for the buffer memory, the first data is written to the buffer memory from the information processing device by DMA transmission;

Basing on the address used for the flash memory and the address for the buffer memory, the first data in the buffer memory is written to the flash memory.

According to the first embodiment of the invention, wherein the first DMA descriptor includes the first DMA descriptor command, the first DMA descriptor data and the second DMA descriptor data, the first DMA descriptor data includes the first address used for the information processing device and the first address used for the buffer memory, the second DMA descriptor data including the second address used for the information processing device and the second address used for the buffer memory, the DMA command includes the address used for the flash memory; the method also includes:

The first DMA descriptor data is converted to a first DMA microinstruction which will be indicating the first address used for the flash memory, the first address for the information processing device as well as the first address for the buffer memory, and the second DMA descriptor data will be converted to a second DMA microinstruction, which will be indicating the second address used for the flash memory, the second address for the information processing device as well as the second address for the buffer memory, wherein the second flash memory address and the first flash memory address are apart from each other at a predetermined offset value;

wherein, when the first DMA descriptor indicates the DMA write operations, basing on the first address for the information processing device and the first address for the buffer memory, the first data is written to the buffer memory from the information processing device by DMA transmission; when the second DMA descriptor indicates the DMA write operations, basing on the second address for the information processing device and the second address for the buffer memory, the second data is written to the buffer memory from the information processing device by DMA transmission;

Basing on the first address used for the flash memory and the first address for the buffer memory, the first data in the buffer memory is written to the flash memory; basing on the second address used for the flash memory and the second address for the buffer memory, the second data in the buffer memory is written to the flash memory.

According to the first embodiment of the invention, wherein: after the first data is written to the flash memory, a message will be sent to the information processing device, to indicate the releasing of the storage space of the buffer memory corresponding to the buffer memory address.

According to the first embodiment of the invention, wherein: when the first data is written to the buffer memory, messages will be sent to the information processing device, to indicate the completion of the first DMA descriptor operation.

According to the first embodiment of the invention, wherein: when the first data is written to the flash memory, messages will be sent to the information processing device, to indicate the completion of the first DMA descriptor operation, and the releasing of the storage space of the buffer memory corresponding to the buffer memory addresses.

A storage device, including a buffer memory, a flash memory, an information processing device interface and a control circuit, is provided in the second embodiment of the invention. The storage device and a information processing device are communicably connected, wherein:

The information processing device interface receives the first DMA descriptor from the information processing device, wherein the DMA descriptor includes the addresses used for the information processing device, the addresses used for the flash memory and the addresses used for the buffer memory;

When the control circuit identifies the first DMA descriptor indicating DMA write operation, basing on the address used for the information processing device and the addresses used for the buffer memory, the first data is written to the buffer memory from the information processing device by DMA transmission;

Basing on the address used for the flash memory address and the addresses used for the buffer memory, the first data in the buffer memory is written to the flash memory by the control circuit.

According to the second embodiment of the invention, wherein after the first data is written to the flash memory, the control circuit will send a message to the information processing device, indicating that the memory space of the buffer memory corresponding to the address used for the buffer memory is released.

According to the second embodiment of the invention, wherein after the first data is written to the buffer memory, the control circuit will send a message to the information processing device, indicating that the first DMA descriptor operation is completed.

According to the second embodiment of the invention, wherein the first DMA descriptor includes the first DMA descriptor command and the first DMA descriptor data, the first DMA descriptor data includes the addresses used for information processing device and for the buffer memory, the DMA descriptor command includes addresses used for the flash memory; the storage device also includes a DMA command analyzer, a DMA write operation controller and a flash memory interface controller:

The DMA command analyzer, convert the first DMA descriptor data into a first DMA microinstruction, wherein the first DMA microinstruction indicates the addresses used for the flash memory, for the information processing device as well as for the buffer memory;

Thereinto, when the first DMA microinstruction indicates the DMA write operation, the DMA write operation controller, basing on the addresses used for the information processing device and for the buffer memory, 1 writes the first data to the buffer memory from the information processing device by DMA transmission;

The flash memory interface controller based on the addresses used for the flash memory and for the buffer memory, will write the first data in the buffer memory to the flash memory.

According to the second embodiment of the invention, wherein the first DMA descriptor includes the first DMA descriptor command, the first DMA descriptor data and the second DMA descriptor data, the first DMA descriptor data includes the first address used for information processing device and the first address used for the buffer memory, the second DMA descriptor data includes the second address used for information processing device and the second address used for the buffer memory, the DMA descriptor command includes address used for the flash memory; the storage device also includes a DMA command analyzer, a DMA write operation controller and a flash memory interface controller:

The DMA command analyzer will convert the first DMA descriptor data into the first DMA microinstruction, the second DMA descriptor data into the second DMA microinstruction, of which the first DMA microinstruction indicates the first address used for the flash memory, the first address used for the information processing device as well as the first address used for the buffer memory; the second DMA microinstruction indicates the second address used for the flash memory, the second address used for the information processing device and the second address used for the buffer memory; wherein the second flash memory address and the first flash memory address are apart from each other at a predetermined offset value;

Thereinto, when the first DMA microinstruction indicates the DMA write operation, the DMA write operation controller, basing on the first address used for the information processing device and the first address used for the buffer memory, will write the first data to the buffer memory from the information processing device by DMA transmission; when the second DMA microinstruction indicates the DMA write operation, the DMA write operation controller, basing on the second address used for the information processing device and the second address used for the buffer memory, will write the second data to the buffer memory from the information processing device by DMA transmission;

The flash memory interface controller basing on the first address used for the flash memory and the first address used for the buffer memory, will write the first data in the buffer memory to the flash memory; and basing on the second address used for the flash memory and the second address used for the buffer memory, it will write the second data in the buffer memory to the flash memory.

According to the second embodiment of the invention, wherein after the first data and the second data is written to the flash memory, the control circuit will send a interrupt to the information processing device, indicating that the memory space of the buffer memory corresponding to the first address used for the buffer memory and the second address used for the buffer memory is released, and the first DMA descriptor operation is completed.

In the third embodiment of the invention, it provides a method for writing data to the storage device, in which the storage device includes a buffer memory and a flash memory, the storage device and the information processing device being communicably connected, wherein the method comprises the followings:

Receiving the first write command from the information processing device, the first write command including the data to be written, the addresses for the flash memory and for the buffer memory;

Basing on the address used for the buffer memory, writing the data to be written to the buffer memory;

Basing on the addresses used for the flash memory and for the buffer memory, write the data to be written in the buffer memory in to the flash memory.

According to the third embodiment of the invention, wherein: after the data to be written is written to the buffer memory, a message will be sent to the information processing device, to indicate the completion of the first write command operation.

According to the third embodiment of the invention, wherein: after the data to be written is written to the flash memory, a message will be sent to the information processing device, to indicate that the memory space of the buffer memory corresponding to the address used for the buffer memory is released.

According to the third embodiment of the invention, wherein: after the data to be written is written to the flash memory, a message will be sent to the information processing device, to indicate that the first write command operation is completed and the memory space of the buffer memory corresponding to the address used for the buffer memory is released.

A storage device including a buffer memory, a flash memory, an information processing device interface and a control circuit, is provided in the fourth embodiment of the invention, the storage device and information processing device being communicably connected, wherein:

The information processing device interface receives the first write command from the information processing device, wherein the first write command includes the data to be written, the addresses used for the flash memory and for the buffer memory;

The control circuit, based on the addresses used for the buffer memory, writes the data to be written to the buffer memory;

The control circuit, based on the addresses used for the flash memory and for the buffer memory, writes the data to be written in the buffer memory to the flash memory.

According to the fourth embodiment of the invention, wherein when the data to be written is written to the buffer memory, the control circuit sends a message as well to the information processing device, to indicate the completion of the first write command operation.

According to the fourth embodiment of the invention, in which after the data to be written is written to the flash memory, the control circuit send a message as well to the information processing device, to indicate the releasing of the memory space of the buffer memory corresponding to the address used for the buffer memory.

According to the fourth embodiment of the invention, in which after the data to be written is written to the flash memory, the control circuit will send a message as well to the information processing device, to indicate the completion of the first write command operation and the releasing of the memory space of the buffer memory corresponding to the address used for the buffer memory.

DESCRIPTION OF THE DRAWINGS

When reading along with the drawings, by reference to the detailed description of embodiments showed hereinafter, the present invention, as well as the preferred mode and its further purpose and advantages will be best understood, wherein the drawings include.

DETAILED DESCRIPTION

Figure 1:
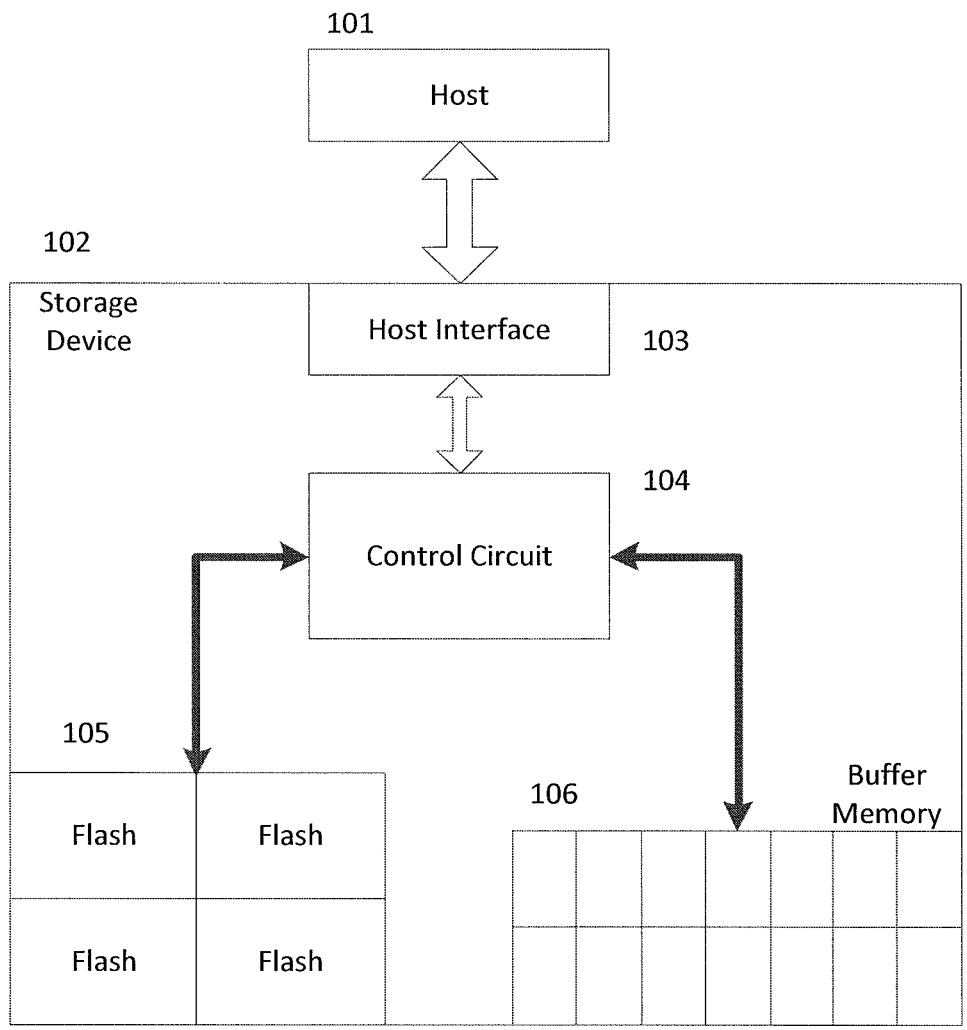
FIG. 1 is a block diagram of the storage device according to the embodiments of the present invention.

FIG. 1 is a block diagram of the storage device according to the embodiments of the present invention. The embodiment shown in FIG. 1 includes a host 101 and a storage device 102 coupled to the host 101. The host 101 may be coupled with the storage device 102 through multiple ways, including but not limited to such as SATA, IDE, USB, PCIE, SCSI, Ethernet, fibre channel, wireless communication network connecting the host 101 and the storage device 102. The host 101 can be the information processing device capable of communicating with the storage device through the ways above, for example, personal computer, tablet computer, server, portable computers, network switches, routers, cellular phones, personal digital assistant, etc. The storage device 102 includes a host interface 103, a control circuit 104, one or more flash memory chip 105 and a buffer memory 106. The host interface 103 may be adapted to the host 101 for exchanging data by such as SATA, IDE, USB, PCIE, SCSI, Ethernet, fibre channel, etc. The control circuit 104 is used for controlling the data transmission between the host interface 103, the flash memory chip 105 and the buffer memory 106, also for flash memory management, mapping of host logical address to physical address, wear-leveling, bad block management, etc. The control circuit 104 can be implemented by variety ways of software, hardware, firmware or combinations thereof. The control circuit 104 can be FPGA (Field-programmable gate array), ASIC (Application Specific Integrated Circuit) or their combination. The control circuit 104 can also include a processor or controller.

According to one embodiment of the invention, the host 101 sends a read command or write command to the storage device 102. The control circuit 104 receives the read command or write command via the host interface 103. In FIG. 2 the first written command 200 is described in detail as an example.

Figure 2A:
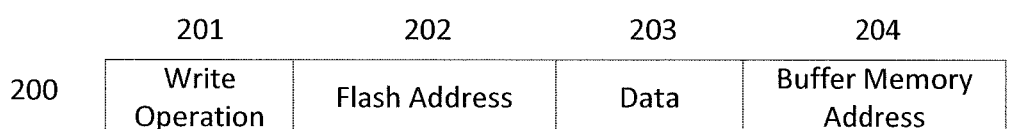
FIG. 2A, 2B is a schematic diagram according to the write command in the embodiments of the present invention.
Figure 2B:
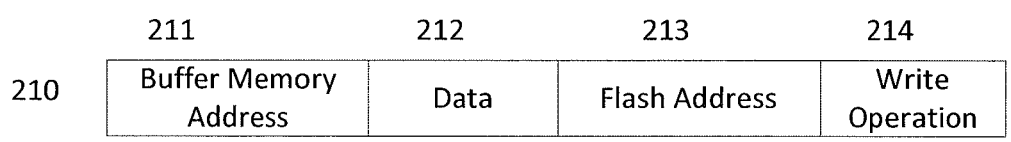

Referring to FIG. 2A, 2B, FIG. 2A is a schematic diagram of the write command according to the embodiment of the invention. Write command 200 includes fields 201, 202, 203 and 204. The field 201 indicates the command as the write command, the field 202 as the flash memory address, the field 203 as the data. The write command 200 indicates that the storage device 102 writes the data in the data field 203 to the flash memory chip 105 basing on the flash memory address indicated by the field 202. The field 204 is the buffer memory address, when the storage device 102 receives the write command 200, it first writes the data in the data field 203 to the buffer memory 106 based on the flash memory address indicated by the field 204, then writes the data in the data field 203 to the buffer memory 105 based on the flash memory address indicated by the field 202. In one embodiment, the field 203 carries data to be written to the flash memory 105. In another embodiment, the field 203 can carry a pointer, which points to the data to be written to the storage device 102, and the data can be stored in the memory of the host 101, in which case, the storage device 102 gets the data from the host 101 through the subsequent DMA transmission process. In still another embodiment, the field 203 can carry a pointer, which points to the data to be written to the storage device 102, and the data can be stored in the memory of the buffer memory of the memory 102. The field 202 can be the physical or logical address of the flash chip 105 to which the data is to be written to. The field 202 can also be a pointer pointing to the buffer memory 106, in which stores the physical or logical address used for the flash memory chip 105. The conversion process from the logical address to physical address, can be achieved by way of looking up an address mapping table. In one example, after the storage device 102 writes the data in the data field 203 to the buffer memory 106 based on the flash memory address indicated by the field 204, it then reads out the data from the buffer memory 106, then writes the data to the flash memory chip 105. The operation of writing data to the buffer memory 106, and the operation of memory of reading out and writing another data in memory 106 to flash memory chip 105 can be executed concurrently, so that the concurrence performance of the write operations from the host 101 to the storage device 102 can be improved, and the complexity of the control circuit 104 will not be significantly increased, because the control circuit 104 does not need to process the space allocation tasks of the buffer memory 106. In one embodiment, the field 204 can be a full address of the buffer memory 106, and in another embodiment, the field 204 is an offset value relative to a base address.

Person skilled in the relevant technical field will be easy to realize that the write command may have a variety of specific coding schemes and field orders. For example, as illustrated in FIG. 2B, field 214 indicating the write command 210 as the type of write operation can be at the end or any other location of the write command 210. The field 211 carries the buffer memory address, and the field 212 carries the data or pointers pointing to storage location of the data. In the field 213 it stores the flash memory address, or a pointer pointing to the storage of the flash memory address, in which the flash memory address can be a logical address or physical address.

Figure 3:
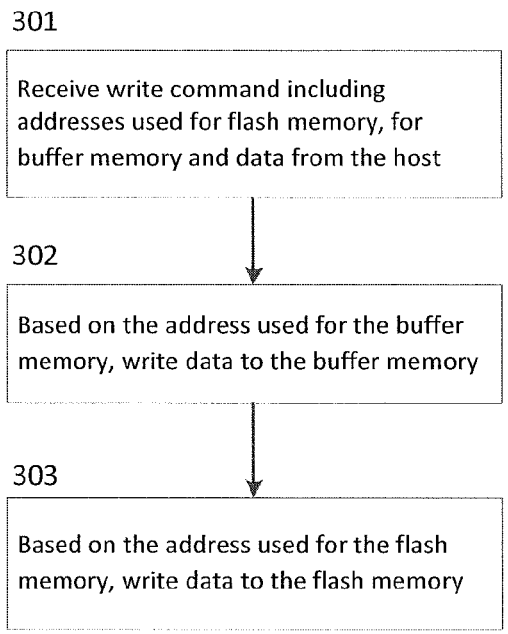
FIG. 3 is a flow chart of the method of executing the write command according to the storage device in the embodiments of the present invention.

FIG. 3 is a flow chart of the method of the storage device executing the write command according to the embodiments of the present invention. In step 301, the storage device 102 receives the write command 200 from the host 101. After the control circuit 104 of the storage device 102 receives the write command 200 through the host interface 103, it will extract, contained in the write command 200, the field 201 used for indicating the type of operation to be write operation, the field 202 used for indicating the flash memory address to be written, the field 203 used for indicating the data to be written, and the field 204 used for indicating the address of the buffer memory 106. In step 302, in response to the write command 200, control circuit 104 gets the address used for the buffer memory 106 basing on the field 204, and gets the data to be written basing on the field 203, and then writes the data to be written to the position in the buffer memory 106 indicated by the field 204. After writing data to the buffer memory 106, the storage device 102 may send a message to the host indicating the completion of executing the write command 200, although the data has not been actually written to the flash memory chip 105. In this way, it appears to the host 101 that, after the completion of step 302, the executing of the write command 200 has been completed, thus the performance of the storage device 102 executing the write command 200 is enhanced. Messages sent to the host can be contained in the interrupt request being sent by the storage device 102 to the host 101. Other appropriate transmit modes can also be chosen basing on the coupling modes (SATA, IDE, USB, PCIE, SCSI, Ethernet, fibre channel, wireless communication network) between the host 101 and the storage device 102. After the data to be written is written to the buffer memory 106, under control of the control circuit 104, the data to be written indicated by the field 203 will be written to the flash memory chip 105 basing on the flash memory address indicated by the field 202 (step 303). After writing data to the flash memory chip 105, the storage device 102 may also send a message to the host indicating the completion of executing the write command 200. In particular, the host may write data again to the address indicating the buffer memory 106 in the write command 200, and not cause data errors due to rewriting the data of the address. In one example, if the field 202 is indicating the logical address used for the flash memory chips 105, then the logical address will be converted into a physical address for the flash memory chip 105. The conversion mode from the logical address to physical address is known by person skilled in the technical field. In one example, in step 303, the written data is obtained again from the buffer memory 106, and then is written to the flash memory chip 105. Person skilled in the technical field will be aware that under control of the control circuit 104, the operation of writing data to the buffer memory 106 in step 302, and the operation of writing data to the flash memory 105 in step 303, can be executed concurrently. So, the storage device 102 can be processing multiple write commands simultaneously, wherein, in one moment, the control circuit 104 writes a first data to the buffer memory 106 basing on a write command; while basing on another write command, control circuit 104 will write a second data in the buffer memory 106 to the flash memory chip 105. The buffer memory 106 can be a dual port memory, so that when the first data is written to the buffer memory 106 via the first port, at the same time, the second data can be read from the buffer memory 106 via the second port. Person skilled in the technical field will be aware of the other modes of implementing the buffer memory 106, to support the simultaneous read and/or write operation on multiple pieces of data.

By carrying the field 204 used for indicating the address of the buffer memory 106 in the write command, the maintenance work of the buffer memory 106 is removed from the control circuit 104, and the host 101 will be more flexible in controlling the storage device 102.

Figure 4:
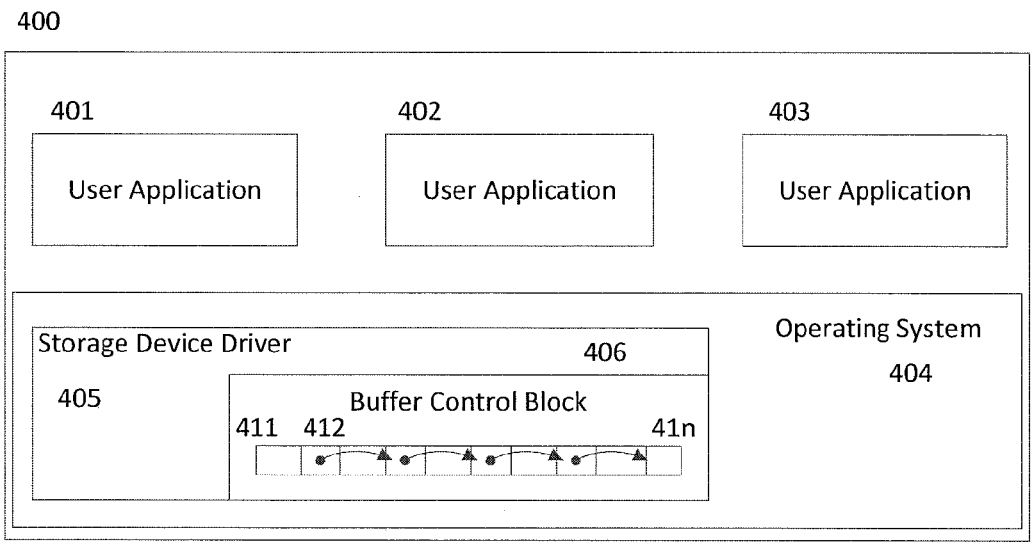
FIG. 4 is a schematic diagram of the host according to the embodiment of the invention.

FIG. 4 is the schematic diagram of the host according to the embodiment of the invention. FIG. 4 is a block diagram showing the software components of the host 400. The host 400 may be a personal computer, a server computer or other devices with computing capability. The host 400 includes one or more user applications 401, 402 and 403, and the operating system 404. The operating system 404 has a storage device driver 405. In the embodiment of the invention, the driver 405 comprises a buffer control block 406 in it, used to control the buffer memory 102 of the storage device 106 in the host 400. The buffer control block 406 is composed of a plurality of storage units (411, 412 . . . 41N), in which each storage unit (411, 412 . . . 41N) of the buffer control block 406 corresponds to a storage unit of the buffer memory 106, and records the working state of the corresponding storage unit in the buffer memory 106. In one embodiment, each of the storage units (411, 412 . . . 41n) in the buffer control block 406, records that the corresponding storage unit in the buffer memory 106 is free or already occupied. In a further embodiment, a read/write command being sent to the storage device 102 involves multiple storage units in the buffer memory, for example 2. In this case, the 2 storage units (411, 412) in the buffer control block 406 are associated together, and this relationship is also recorded in the storage units 411, 412, for example, one or more pointer pointing to the storage unit 412 is recorded in the storage unit 411. Still in a further embodiment, one or more pointer pointing to the storage unit 411 is also recorded in the storage unit 412.

Figure 5:
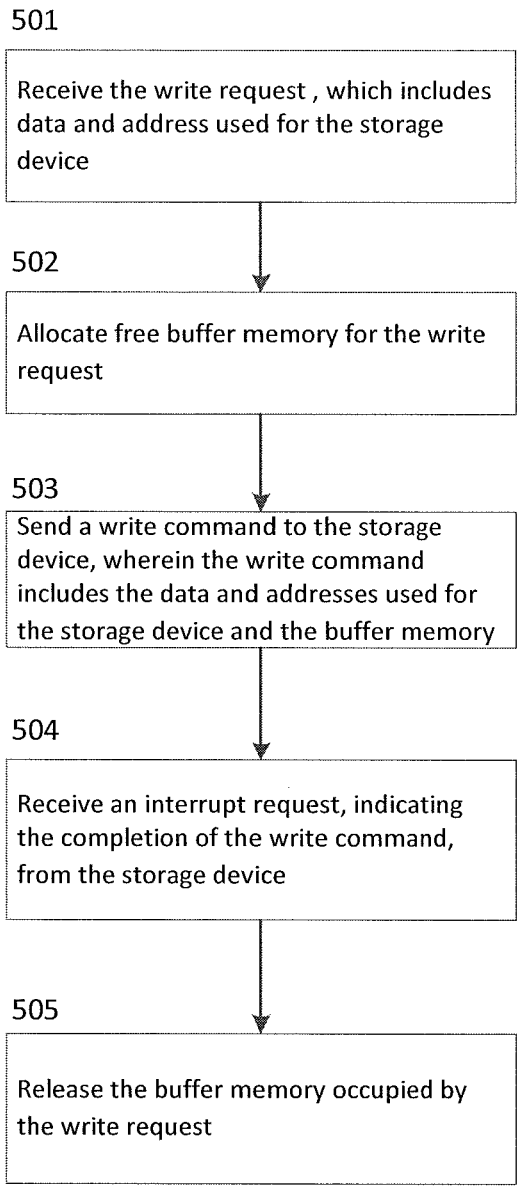
FIG. 5 is a flow chart of the host executing the write operation according to the embodiment of the invention.

FIG. 5 is a flow chart of the host executing write operation according to the embodiment of the invention. When a user application program or other programs requests executing the operation of writing data to the storage device, application program or other programs sends a write request. The storage device driver 405 in FIG. 4 receives the write request (step 501), which includes data to be written and addresses used for the storage device provided by the application program or other programs. The address used for the storage device can be a file path and the offset value, and can be further converted to a logical address used for the storage device. In one example, the logical address is used for the flash memory chip on the storage device, and the write request is to write the data basing on the logical address to the flash memory chip. In step 502, the storage device driver 405 will allocate free buffer memory for the write request. Specifically, traverse the buffer control block 406, finds the storage unit in free state, for example, the storage unit 411. The storage unit 411 in free state shows that the corresponding storage unit in the buffer memory 106 in the storage device 102 is in free state, and it can receive the written data.

In step 503, the storage device driver 405 sends a write command to the storage device 102, in which the write command includes the data to be written and addresses used for the storage device 102, and it also includes the address used for the buffer memory 106 corresponding to the storage unit 411. Person skilled in the technical field will be aware that there are various ways to obtain the correspondence between the storage unit 411 and buffer memory 106. For example, the buffer control block 406 has N storage units (411, 412 . . . 41N), and the buffer memory 106 also includes N storage units, in which the storage unit 411 corresponds to the first storage unit in the buffer memory 106, and the storage unit 412 corresponds to the second storage unit in the buffer memory 106, and similarly, the storage unit 41n corresponds to the Nth storage unit in the buffer memory 106, so that basing on the position of the storage unit 411 in the buffer control block 406 the address of the corresponding storage unit in the buffer memory 106 can be calculated. Still as an example, it can also store the address of the corresponding storage unit in the buffer memory 106 in the storage unit (411, 412 . . . 412). In still another example, the write command carries a sequence number, which not only indicates the position of the storage unit 411 in the buffer control block 406, but also the position of the corresponding storage unit in the buffer memory 106.

In step 504, the message is received from the storage device 102. In one example, the message is an interrupt request which indicates that the write command sent in step 503 has been executed. As previously mentioned, in one example, after the data in the write command is written to the buffer memory 106 by the control circuit 104 in the storage device 102 (in particular, it is written to the storage unit in the buffer memory 106 corresponding to the storage unit 411 in the buffer control block 406), the storage device will send an interrupt, indicating the completion of the write command. In one example, after the control circuit 104 writes the data to the flash memory chip 105, the storage device 102 will send an interrupt to host 101. In one example, the interrupt request also includes information indicating the storage unit of the buffer control block 406 related to the write command sent in step 503. This information can be one or more storage unit (411, 412 . . . 41N) address, or one or more storage unit (411, 412 . . . 41N) serial number.

In step 505, in response to the interrupt request received in step 504, and basing on the information of the storage unit of the buffer control block 406 that related to the write command indicated by the interrupt request, the storage units (411, 412, . . . 41N) of the buffer control block 406 related to the write command will be released. Releasing the storage unit (411, 412 . . . 41N) can be specifically setting in the storage unit (411, 412 . . . 41N) the corresponding storage unit in the buffer memory 106 to be in free state.

In one example, the write command in step 503 involves two storage units 411 and 412 of the buffer control block 406, and, the storage unit 411 and 412 record the pointers pointing to each other separately, to show that the two storage unit 411, 412 are associated to the same write command. In the received interrupt request in step 504, it can either indicate the storage unit 411 or indicate the storage unit 412. In step 505, basing on one of the pointers pointing to the storage unit 411 and 412, two storage units 411 and 412 can be obtained, and then released. Similarly, Person skilled in the technical field will be aware that in this way three or more storage units (411, 412 . . . 41N) can also be associated in the write command.

Figure 6:
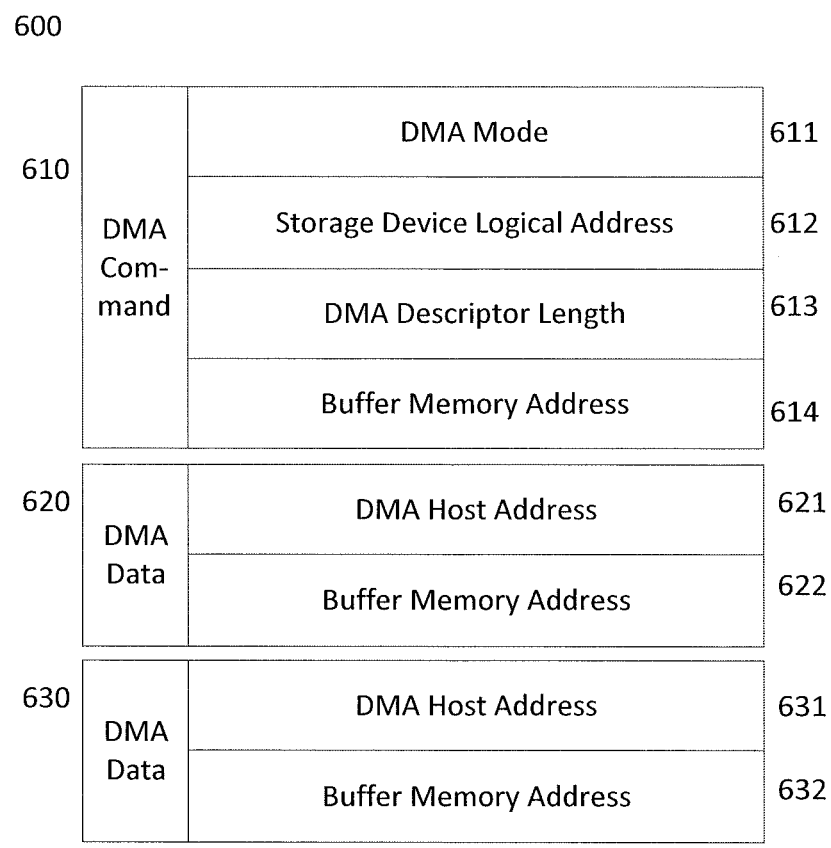
FIG. 6 is a schematic diagram of second write command according to the embodiment of the present invention.

FIG. 6 is the schematic diagram of the second write command according to the embodiment of the present invention. The second write command indicates the storage device 102 to obtain data from the host 101 by DMA and write the data to the flash memory chip 105. The second write command can be a DMA descriptor 600. The DMA descriptor 600 includes a DMA command 610 and one or more DMA data (620, 630). The DMA command 610 includes a field 611, indicating the DMA mode, namely, the operation indicated by the DMA descriptor 600, which can do read, write, erase or other operation to the flash memory. The field 612 indicates the logical address of the storage device. The field 613 indicates the length of the DMA descriptor 600, namely, the number of DMA data (620, 630) included in the DMA descriptor 600, which can be 1 or more. The field 614 indicates the address of the buffer memory 106. The DMA data 620, 630 each includes the field 621 and 631, indicating the host address in the DMA transmission. The DMA data 620, 630 also each includes the field 632 and 622 respectively, indicating the address of the buffer memory 106.

The logical address of the storage device in the field 612 of the DMA command 610 can be used for DMA data 620, 630. In the case of the DMA descriptor 600 including only the DMA data 620, the storage device 102, basing on the host address indicated by the field 621 and the buffer memory address indicated by the field 622, starts DMA transmission between the host 101 and the storage device 102, and ultimately stores the received data to the flash memory chip 105 indicated by the field 612. In the case of the DMA descriptor 600 including the DMA data 620 and 630, the storage device 102 executes the DMA transmission data basing on the DMA data 620 and ultimately stores the data in the flash memory chip 105, and the storage device 102 will also execute the DMA transmission data basing on the DMA data 630, and ultimately stores the data in the flash memory chip 105 indicated by the field 612 plus a predetermined offset value. In other words, the DMA descriptor 600 can indicate the multiple DMA transmission between the host 101 and the storage device 102, each DMA transmission corresponding to one of the DMA data 620, 630, each DMA transmission transmitting the same amount of data (e.g. 4K bytes), and the logical address of the DMA transmission storage device corresponding to the DMA data 620 and DMA data 630 is continuous (e.g., at a distance of a predetermined offset value, which can be corresponding to the amount of the DMA transmission data). Thus it can carry only one logical address of the storage device in the DMA descriptor 600 (field 612). The two DMA host addresses of the DMA transmission (field 621, 631) corresponding to the DMA data 620 and 630 can be uncontinuous, which may support the Scatter-Gather DMA transmission mode.

In the DMA transmission corresponding to the DMA data 620, the DMA host address data indicated by the field 621 is written to the buffer memory 106 indicated by the field 622, and then written to the flash memory chip 105. In the DMA transmission corresponding to the DMA data 630, the DMA host address data indicated by the field 631 is written to the buffer memory 106 indicated by the field 632, and then written to the flash memory chip 105.

The field 614 is optional. In the buffer memory address corresponding to the field 614, as an example, the length of the field 613 indicated by the DMA descriptor 600 can be saved. Thus it can record how many of the DMA transmissions corresponding to the multiple DMA data 620, 630 have been executed and how many have not yet. For the DMA descriptor 600, when all the DMA transmissions corresponding to the DMA data 620, 630 have been executed, for example, after the corresponding data is written to the flash memory chip 105, the storage device 102 will send an interrupt to the host 101 indicating the completion of executing the DMA descriptor 600. Thus, although the DMA descriptor 600 is corresponding to two DMA transmission processes, but it will only send one interrupt to host 101. Reducing the interrupt request will help decrease the work load of the host 101.

Figure 7A:
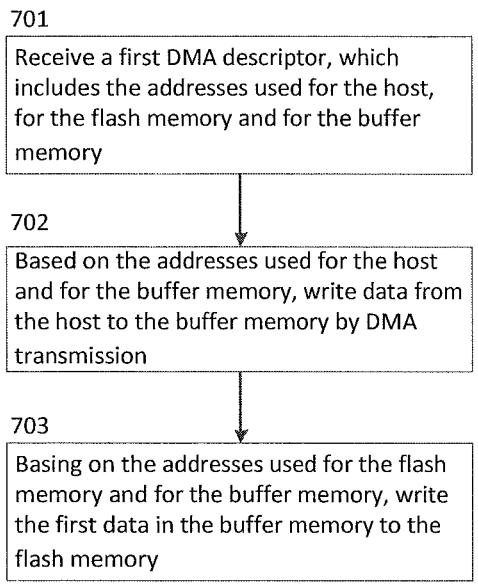
FIG. 7A, 7B is a flow chart based on the second write command executed by the storage device according to the embodiments of the present invention.
Figure 7B:
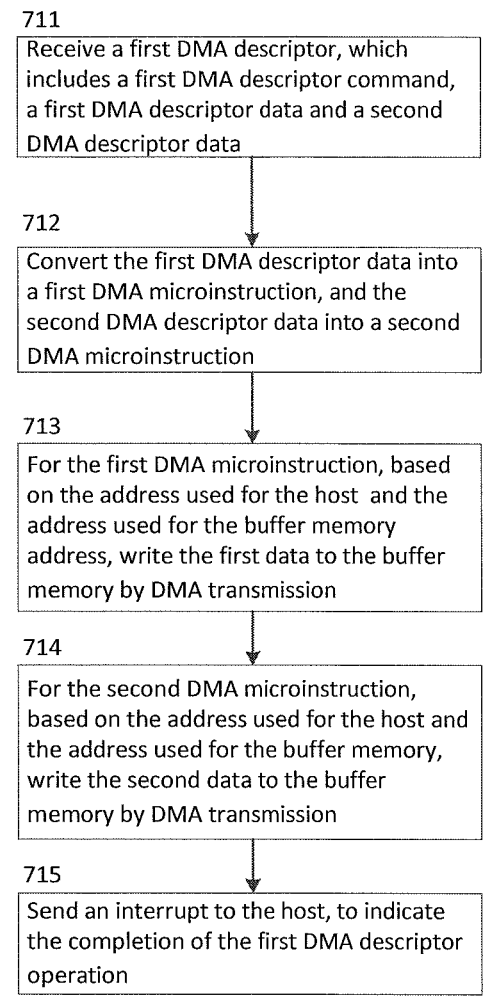

FIG. 7A, 7B is a flowchart of the storage device executing the second write command according to the embodiments of the present invention. The second write command can be the descriptor 600 shown in FIG. 6. As illustrated in FIG. 7A, in step 701, the storage device 102 receives the DMA descriptor 600. The DMA descriptor 600 includes the addresses used for the host (for example, the DMA host addresses 621, 631), for the flash chip 105 (for example, the logical address of the storage device 612) as well as for the buffer memory 106 (for example, buffer memory addresses 622, 632). Although in FIG. 6 the DMA descriptor 600 includes the DMA commands 610, DMA data 620, 630, but it is only for a clear express. The DMA command 610, DMA data 620, 630 can also be combined together. The storage device 102 extracts the addresses for the host, for the flash memory chip 105 as well as for the buffer memory 106 from the DMA descriptor 600.

In step 702, basing on the addresses used for the host and for the buffer memory, the storage device 102 writes data from the host 101 to the buffer memory 106 by DMA transmission. In step 703, basing on the addresses used for the flash memory and for the buffer memory, the data written to the buffer memory in step 702 is written to the flash memory chip 105.

In one example, in step 702, after the data is written to the buffer memory 106, an interrupt is sent to the host, indicating the completion of executing the DMA transmission. If the DMA descriptor 600 only includes this DMA transmission (e.g., DMA descriptor 600 includes only the DMA command 610 and DMA data 620), the interrupt also indicates the completion of executing the DMA descriptor 600. In one example, in step 703, after the data is written to the flash memory chip 105, an interrupt is sent to the host 101 sends, indicating the completion of executing the DMA transmission.

As illustrated in FIG. 7B, it shows the more detailed process of processing the DMA descriptor 600 containing multiple DMA data (620, 630). In step 711, the storage device 102 receives the DMA descriptor 600, which includes the DMA command 610, DMA data 620 and 630.

In step 712, basing on the DMA descriptor 600, the DMA data 620 will be converted into the first DMA microinstruction, and the DMA data 630 will be converted into the second DMA microinstruction. The first DMA microinstruction comprises the DMA host address 621 and the buffer memory address 622. Basing on the first DMA microinstruction, it can also obtain the logical address 612 of the storage device corresponding to the first DMA microinstruction, the DMA operation type and the DMA descriptor length 613. The logical address 612 of the storage device and the DMA operation type can be a part of the first DMA microinstruction, and can also be stored in the buffer memory 106, and can be accessed through the index in the first DMA microinstruction, and can also identify the operation type of the first DMA microinstruction by placing the first DMA microinstruction in the specific operation queue (read, write, erase, etc.).

Still as another example, for the first DMA microinstruction, basing on the buffer memory address 622 and a predetermined offset, a pointer stored in the buffer memory 106 is obtained. Basing on the pointer the logical address 612 of the storage device 612 and/or the DMA descriptor length 613 will be obtained. In a similar way, for the second DMA microinstruction, basing on the buffer memory address 632 and a predetermined offset a pointer stored in the buffer memory 106 is obtained. Basing on the pointer the logical address 612 of the storage device and/or the DMA descriptor length 613 will be obtained.

In the preferred embodiment, basing on the buffer memory address 614, the DMA descriptor length 613 is stored in the buffer memory 106, in which the DMA descriptor length is equal to the number of the DMA data in the DMA descriptor 600 (or the total number of the DMA command and DMA data in the DMA descriptor 600, out of which the number of the DMA data can be got) and the DMA descriptor length 613 is accessed via the index in the DMA microinstruction. Thus, the execution sequence of the first DMA microinstruction and second DMA microinstruction becomes umimportant. Each execution of a DMA instruction will decrease the DMA descriptor length of the buffer memory 106 progressively (for example, minus 1 or minus unit length), and when the DMA descriptor length of the buffer memory 106 becomes 0, it means that the execution of all the DMA operation to the DMA descriptor 600 is completed.

In step 713, for the first DMA microinstruction, basing on the DMA host address 621 and buffer memory address 622, the data will be written to the buffer memory 106 by DMA transmission.

In step 714, for the second DMA microinstruction, basing on the DMA host address 631 and buffer memory address 632, the corresponding data will be written to the buffer memory 106 by DMA transmission.

In step 715, an interrupt is sent to the host, to indicate the completion of the DMA descriptor 600 operation.

In an example, step 713 also includes writing the data corresponding to the first DMA microinstruction which will be written to the buffer memory 106, basing on the logical address of the storage device 612, to the flash memory chip 105. Step 714 also includes writing the data corresponding to the second DMA microinstruction which will be written to the buffer memory 106, basing on the logical address of the storage device 612 plus a predetermined offset value, to the flash memory chip 105.

In the preferred embodiment, in step 713, 714, after writing the corresponding data to the buffer memory 106, also basing on the index in the first, second microinstructions, it will access to the DMA descriptor length stored in the buffer memory 613, and decrease the DMA descriptor length 613 progressively (for example, minus 1 or minus unit length). Thus, when the DMA descriptor length 613 becomes 0, it means that the operation to the DMA descriptor 600 is completed. In this way, it can process simultaneously multiple DMA descriptors 600 in the storage device 102, and the execution sequence of the first DMA microinstruction and second DMA microinstruction is unimportant. Other ways can also be used to identify the multiple DMA data in the DMA descriptors 600 being executed. For example, it will provide flags for each DMA data of each DMA descriptor 600 in the buffer memory or registers, whenever a DMA data (DMA microinstruction) is executed, setting the corresponding flags. It can also sequentially execute each DMA data (DMA microinstruction) of the DMA descriptor 600, when the last DMA data (DMA microinstruction) is executed, meaning the execution of the DMA descriptor 600 completed.

In still another embodiment, when each DMA microinstruction of the DMA descriptor 600 is executed, an interrupt will be sent to the host 101, and it will be analyzed by the host driver whether the execution of the DMA descriptor 600 has been completed. The analytical method is similar to identifying whether the multiple DMA data of the DMA descriptor 600 in the storage devices 102 have been executed.

Figure 7C:
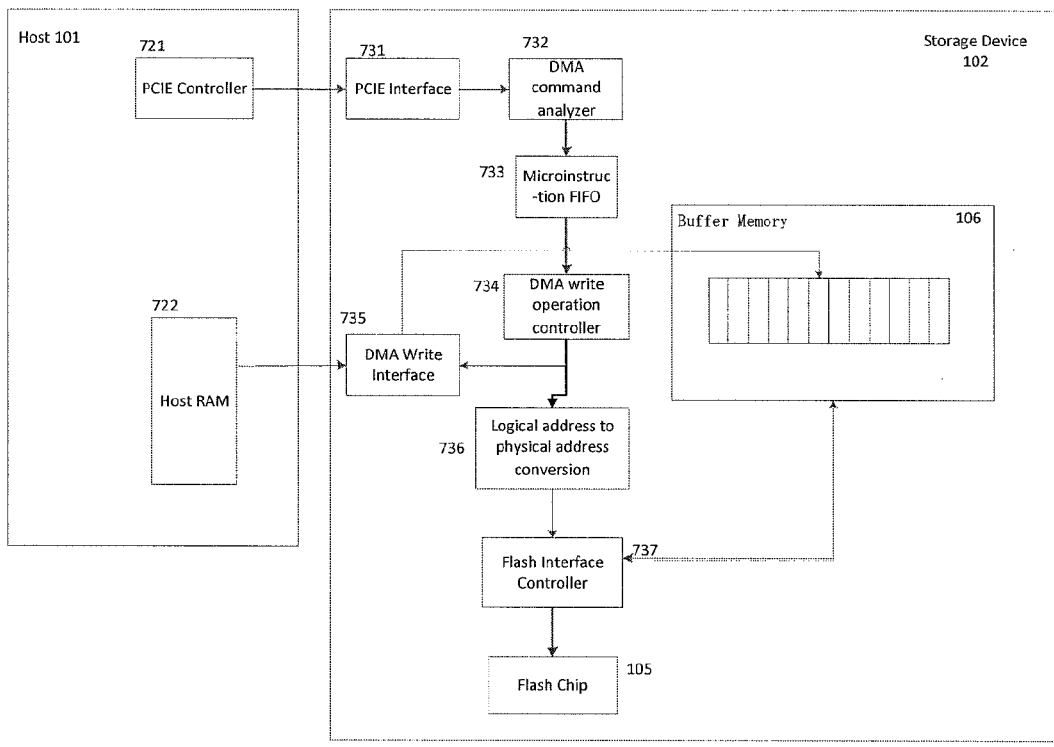
FIG. 7C shows a hardware block diagram for the implementation of the storage device which executes the second write command in FIG. 7A, 7B.

FIG. 7C shows a hardware block diagram of the storage device executing the second write command in FIG. 7A, 7B. In FIG. 7C, the host 101 includes a PCIE controller 721 and a host memory 722. The host memory 722 can be a random access memory (RAM), and the PCIE controller 721 can be used for communicating with the storage device via the PCIE bus. The storage device 102 includes a PCIE interface 731, a DMA command analyzer 732, a microinstruction FIFO (FIFO buffer) 733, a DMA write operation controller 734, a DMA write interface 735, a logical address to physical address conversion circuit 736, a Flash interface controller 737, a flash memory chip 105 and a buffer memory 106.

The PCIE interface 731 receives the DMA descriptor 600 sent from the host 101 through the PCIE controller 721. The connection between the host 101 and the storage device 102 is not limited to PCIE, and can also be the SATA, IDE, USB, PCIE, SCSI, Ethernet, fibre channel, etc. The DMA command analyzer 732 will convert the DMA descriptor 600 received by the PCIE interface 731 into the DMA microinstruction. As for the DMA descriptor 600 shown in FIG. 6, it includes the DMA data 620 and DMA data 630, and then the DMA command analyzer will convert them into the first DMA microinstruction corresponding to the DMA data 620 and the second DMA microinstruction corresponding to the second DMA data 630. The structure of the first DMA microinstruction and the second DMA microinstruction has been introduced above in detail. The DMA command analyzer 732 also extracts the DMA descriptor length from the DMA command 610 of the DMA descriptor 600, and stores it in the buffer memory 106, a register or analogues. The DMA descriptor length indicates the number of DMA data included in the DMA descriptor 600, and also indicates the number of the DMA microinstructions obtained from the DMA descriptor 600. The DMA command analyzer 732 will store the first DMA microinstruction and second DMA microinstruction in the microinstruction FIFO 733.

The microinstruction FIFO 733 can cache the DMA microinstruction, and in a way of FIFO provides DMA microinstructions to the DMA write operation controller 734. Although here only takes the write operation as an example, it is described that the DMA microinstruction corresponding to the DMA write operation is cached in the microinstructions FIFO 733. Person skilled in the technical field will be aware that the DMA microinstruction corresponding to the DMA read operation and the DMA microinstruction corresponding to the DMA write operation can be mixedly cached in the microinstruction FIFO 733. The microinstruction FIFO 733 can also be configured into two or more parts, of which one part is dedicated to storing the DMA microinstruction corresponding to the DMA read operation, and the other part is dedicated to storing the DMA microinstruction corresponding to the DMA write operation.

As for the DMA microinstruction corresponding to the DMA write operation, for example, the first DMA microinstruction and second DMA microinstruction mentioned before, the DMA write operation controller 734 will execute the DMA write operation basing on the DMA microinstructions. As previously mentioned, the first DMA microinstruction includes the DMA host address 621 and the buffer memory address 622. DMA The DMA write operation controller 734, using the DMA host address 621 and the buffer memory address 622, initiates the DMA write operation via the DMA interface 735 between the host 101 and the storage device 102, and it will transmit the data stored in the DMA host address 621 to the position indicated by the buffer memory address 622, wherein the transmitted data can have a predetermined length (e.g. 4K bytes). As for the second DMA microinstruction, the DMA write operation controller 734 will executer a similar operation, transmitting the data stored in the DMA host address 631 to the position indicated by the buffer memory address 632.

From the first DMA microinstruction and second DMA microinstruction, the logical address used for the respective storage device can be obtained. In the logical address to physical address conversion circuit 736, the logical address of the storage device for each DMA microinstruction is converted to the physical address used for the flash memory chips 105. As for each of the DMA microinstruction, the Flash interface controller 737 will write the data written in the buffer memory 106, basing on the physical address provided by the logical address to physical address conversion circuit 736, to the flash memory chip 105.

The Flash interface controller 737, basing on the index in the first and second microinstructions, accesses the stored DMA descriptor length extracted from the DMA command 610 of the DMA descriptor 600, and decrease the DMA descriptor length progressively (for example, minus 1 or minus unit length). Thus, when the DMA descriptor length is 0, it means the completion of the DMA descriptor 600 operation. Then, an interrupt can be sent to the host to indicate the completion of the DMA descriptor 600 operation. In one example, the DMA write operation controller also accesses to the stored DMA descriptor length, and determines whether all data corresponding to the DMA descriptor 600 have been written to the buffer memory 106, and sends the host the interrupt indicating that all data have been written to the buffer memory 106.

Figure 8:
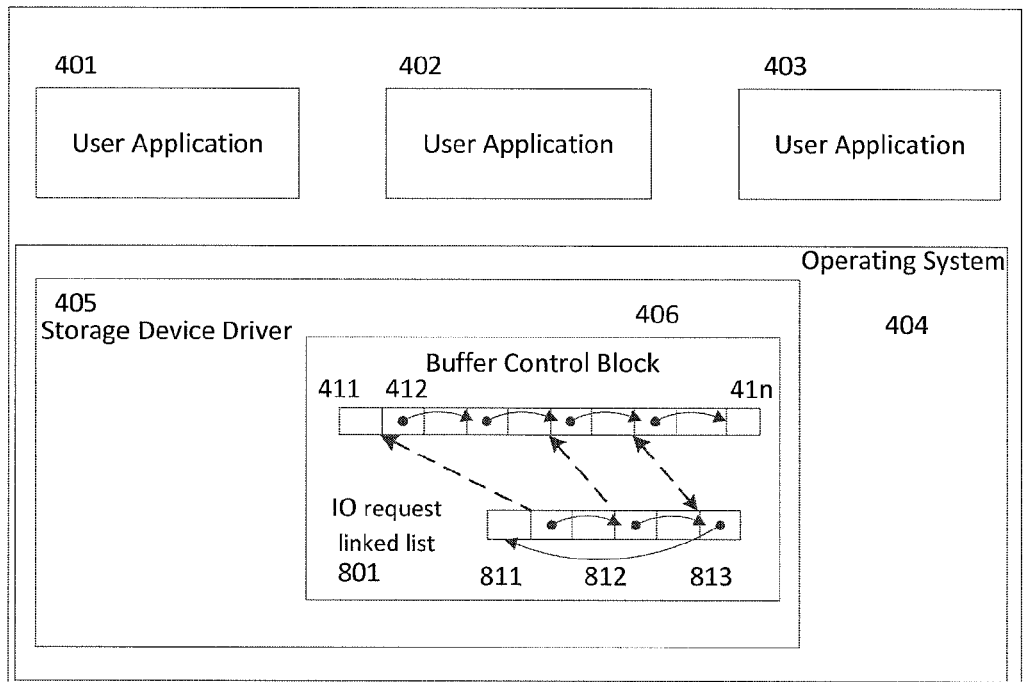
FIG. 8 is a software block diagram of the host according to the embodiment of the invention.

FIG. 8 is a block diagram of the host's software according to the embodiment of the invention. FIG. 8 shows the block diagram of the host 800's software, which is similar to the host's software block diagram shown in FIG. 4. The difference is that in FIG. 8, the buffer control block 406 also includes the IO request linked list 801. The IO request linked list 801 is consisting of the storage units (411, 412 . . . 41N) in the buffer control block 406. The IO request linked list 801 can be a one-way linked list, double linked list or circular linked list. When generating the DMA descriptor 600 as shown in FIG. 6, for a 600 DMA descriptor, a corresponding IO request linked list 801 is created, including the storage units (811, 812, 813) respectively corresponding to the DMA command 610, the DMA data 620, and the DMA data 630. It should be pointed out that the storage unit (811, 812, 813) is the three storage units of the storage units (411, 412, . . . 41N) in the buffer control block 406, and by setting the corresponding pointer, it forms the IO request linked list 801. In FIG. 8, the storage units (811, 812, 813) and the storage units (411, 412 . . . 41N) being displayed separately, is just the need of describing clearly.

Figure 9A:
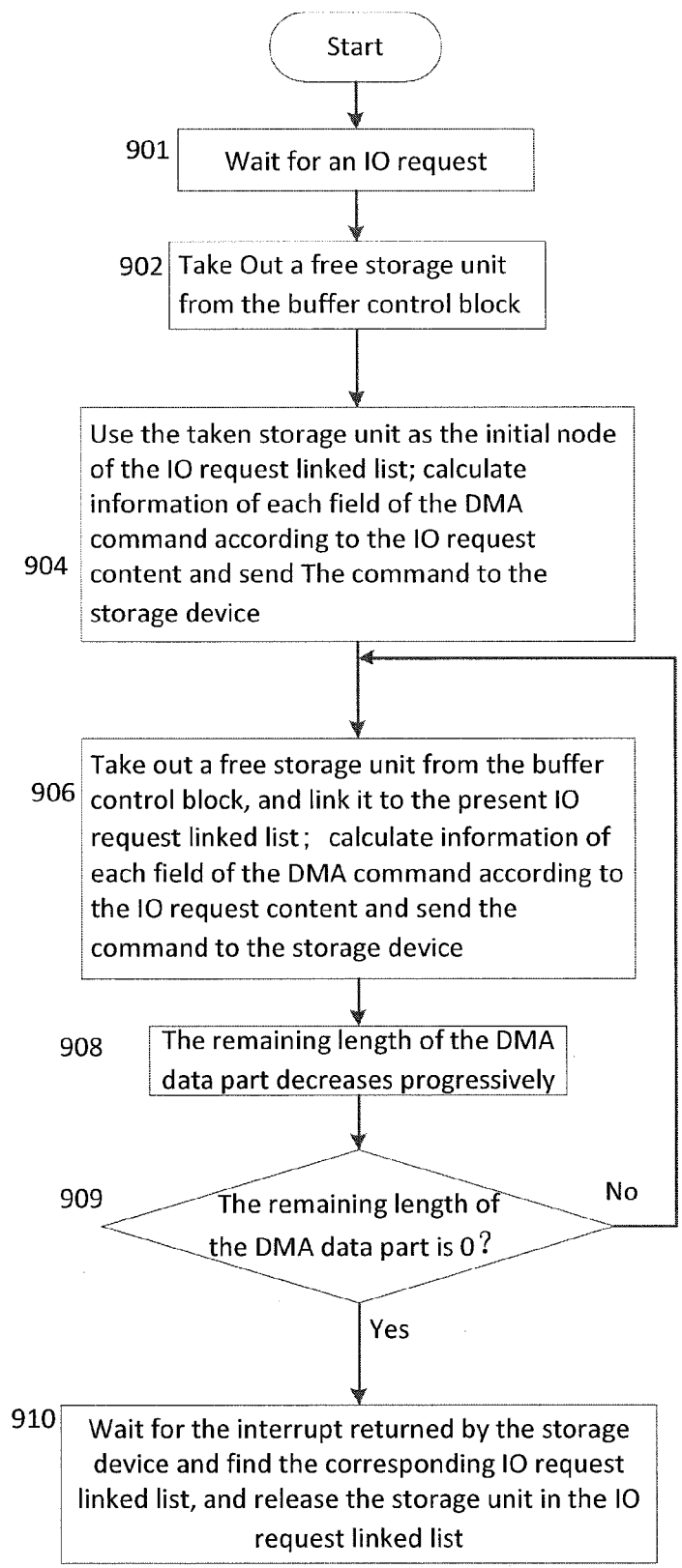
FIG. 9A is a flow chart of the host creating and executing the second write command according to the embodiment of the invention.

FIG. 9A is a flow chart of the host creating and executing the second write command according to the embodiment of the invention. In one embodiment, step 901, the IO request is received by the host's storage device driver 405. The IO request will indicate that the multiple data blocks dispersed in different physical addresses of the host memory will be written to the storage device 102, so the scatter-gather DMA operation will be executed between the host and the storage device. The following will describe the operation process of the host writing data to the storage device by way of example.

In step 902, referring to FIG. 8, an storage unit in free state is taken out from the buffer control block 406, such as the storage unit 411.

In step 904, according to the content of the IO request, it will create the DMA command 610 of the DMA descriptor 600, fill in with the DMA mode field 611 of the DMA command 610 (in this example, a write operation), the storage device logical address field 612 (the information can be obtained from the IO request), the DMA descriptor length field 613 (the information can be obtained from the IO request) and the buffer memory address field 614 (corresponding to the storage unit 411 allocated in step 902). Then the DMA command 610 created will be sent to the storage device 102. And the storage unit 411 will be used as the initial node (for example the storage unit 811) of the IO request linked list 801 of the IO request. An IO request linked list 801 is created, and is used for after the storage device 102 executing the DMA descriptor 600, returning the memory unit occupied back to the buffer control block 406, and notifying application software or other software of the completion of the IO request execution. For this purpose, in one example, the pointer corresponding to the IO request will also be stored in the storage unit 411. Basing on the DMA descriptor length, it can also obtain the remaining length of the DMA data. Before creating the first DMA data, the remaining length of the DMA data part is the number of the DMA data (620, 630) in the DMA descriptor 600, which, as an example, is the DMA descriptor length minus 1.

In step 906, a storage unit in free state is taken out from the buffer control block 406, for example, the storage unit 412. According to the content of the IO request, it will create the DMA data 620 of the DMA descriptor 600, fill in with the DMA host address field 621 of the DMA data 620 (the information can be obtained from the IO request), and the buffer memory address 622 (corresponding to the allocated storage unit 412, for example, the offset value or serial number of the storage unit 412 in the buffer control block 406). And then the created DMA data 620 will be sent to the storage device 102. The storage unit 412 will be used as the node (for example the storage unit 812) of the IO request linked list 801 of the IO request.

In step 908, the remaining length of the DMA data part will be decreased progressively, and the number of DMA data in the DMA descriptor 600 having not yet been sent to the storage device will be obtained.

In step 909, if the remaining length of the DMA data part is 0, it means that the generation of the DMA descriptor 600 has been completed, and then in step 910 the storage device driver 405 will wait for the interrupt returned by the storage device 102 indicating the completion of the DMA descriptor 600 processing, and on the basis of the interrupt find the corresponding IO request linked list 801, and release the storage unit (811, 812) in the IO request linked list 801. In other words, setting the storage units (811, 812) of the IO request linked list 801 in free state, the storage units 411, 412 being in free state can be known via the buffer control block 406. In one example, in the case of the DMA descriptor 600 indicating a read operation, and the host 101's CPU including a cache memory, it will also notice the CPU cache memory associated with the DMA host addresses (621, 631) of the DMA descriptor 600 to execute a consistency processing, in order to reflect that the data in the DMA host address (621, 631) may be changed by the DMA read operation. In one example, the interrupt returned by the storage device 102 includes the content indicating one of the multiple storage units (811, 812) in the IO request linked list 801 (or one of the buffer memory address 622, 632), according to which content, the storage units (811, 812) will be released through the IO request linked list 801.

In step 909, if the remaining length of the DMA data part is larger than 0, it means that the generation of the DMA descriptor 600 has not yet been completed, and it also need to generate one or more DMA data for the IO request, and then the process will return to step 906 and repeat steps 906, 908 and 909.

Figure 9B:
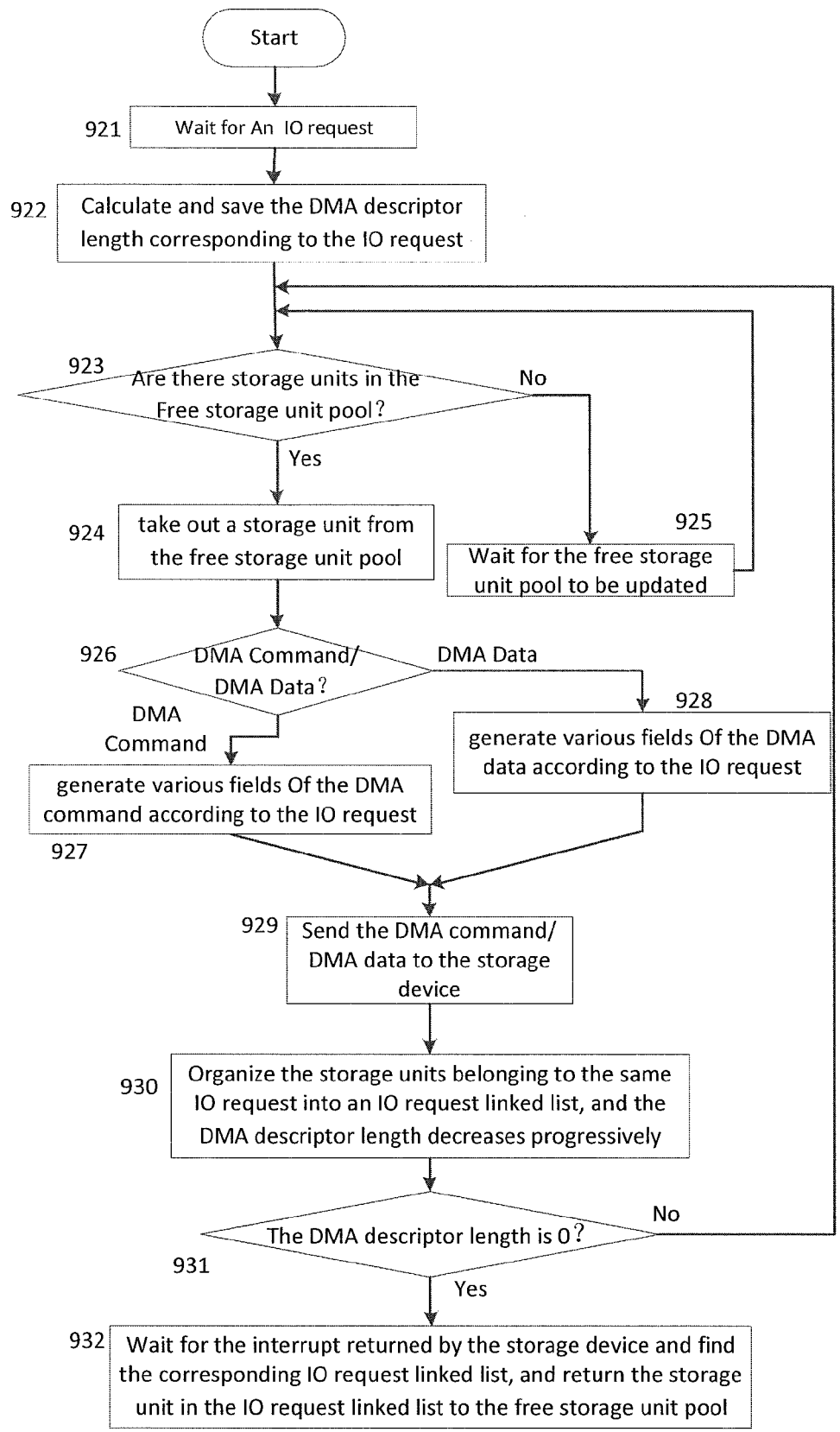
FIG. 9B is a flow chart of the host creating and executing the second write command according to another embodiment of the invention.

FIG. 9B is a flowchart of the host creating and executing the second write command according to another embodiment of the present invention. In this embodiment, the free storage units in the buffer control block 406 are further organized as an free storage unit pool, to contribute to the creating process of the DMA descriptor 600. It will form the free storage unit pool by organizing the free storing units (411, 412 . . . 41N) in the buffer control block 406 into a linked list. When needing to obtain the free storage unit from the buffer control block 406, the storage unit can be removed from the free storage unit pool, thus eliminating the expenditure of searching for a free storage unit in the buffer control block 406.

In one embodiment, in step 921, the IO request is received by the storage device host driver 405. Similar to FIG. 9A, the IO request indicates that the multiple data blocks dispersed in the different physical addresses of the host memory are written to the storage device 102, for which the scatter-gather DMA operation will be executed between the host and the storage device.

In step 922, according to the content of the IO request, it will calculate the length of the DMA descriptor used for corresponding to the same IO requests (for example, the DMA command and the number of the DMA data). It can be noted that in the embodiment shown in FIG. 9A, it is in step 904 creating the DMA command 610 that the DMA descriptor length is obtained, which will remind Person skilled in the technical field that each step is not necessarily implemented in the order disclosed in the embodiment.

In step 923, it determines if the free storage unit pool is empty. If the free storage unit pool is not empty, meaning the buffer control block 406 has storage units in free state, then it will proceed to step 924, and take out an free storage unit from the free storage unit pool (for example, the storage unit 411). If the free storage unit pool is empty, meaning that the buffer control block 406 has no free storage unit. Then in step 925, it should wait for the free storage unit pool being updated, for the appearance of a free storage unit. When the execution of the DMA descriptor is completed, the related storage unit will be released, resulting in new free storage unit in the free storage unit pool. This will be covered in more details later.

In step 926, determine currently whether to generate the DMA command field or the DMA data field for the DMA descriptor 600. In general, the DMA descriptor 600 includes a DMA command and one or more DMA data. When generating the DMA command, the processing will proceed to step 927, and according to the content of the IO request, it will create the DMA command 610 of the DMA descriptor 600, and fill in each fields (611, 612, 613, 614) of the DMA command 610. In one example, the pointer corresponding to the IO request is also stored in the storage unit 411, so that after the execution of the IO request is completed, the IO request can be identified and the application software or other upper level software can be informed. When generating the DMA data, the processing will proceed to step 928, and according to the content of the IO request, it will create the DMA command 620 of the DMA descriptor 600, and fill in each fields (621, 622) of the DMA command 620.

Then, in step 929, the generated DMA command or the DMA data will be sent to the storage device 102. And in step 930, the storage unit 411 obtained in step 924 is set in the IO request linked list 801. As an example, the first storage unit filled in the IO request linked list 801, will serve as the head node of the IO request linked list 801. However, it will also be realized that when the IO request linked list 801 is organized into a circular linked list, it has no "head node" in it. In step 930, the DMA descriptor length will also be decreased progressively.

In step 931, if the DMA descriptor length is 0, it means that the generation of the DMA descriptor 600 has been completed, and then in step 932 the storage device driver 405 will wait for the interrupt returned from the storage device 102 indicating the completion of processing the DMA descriptor 600, and on the basis of the interrupt find the corresponding IO request linked list 801, and release the storage units (811, 812) in the IO request linked list in 801. In other words, setting the storage units (811, 812) in the IO request linked list 801 to free state the storage units 411, 412 will be known in free state through the buffer control block 406, and the storage units 411, 412 will be returned to the free storage unit pool. In one example, the interrupt returned from the storing device 102 includes the content indicating one of the multiple storage units (811, 812) of the IO request linked list in 801, on the basis of which content the storage unit (811, 812) will be released through the IO request linked list 801.

In step 931, if the DMA descriptor length is larger than 0, then it means that the generation of the DMA descriptor 600 has not yet been completed, and one or more DMA data also need to be generated for the IO request. Then the process will return to step 923 and repeat steps 923-931.

It describes the generation process of the DMA descriptor 600 referring to FIG. 9A, 9B diagram above. The DMA descriptors 600 is used for describing the multiple DMA operations executed in scatter-gather DMA, wherein the multiple DMA operations' data come from the storage in a storage space continuous or not. Person skilled in the technical field will be easy to aware that the generation types of the DMA descriptor 600 include but are not limited to the specific types described above in FIG. 9A, 9B.

Figure 10A:
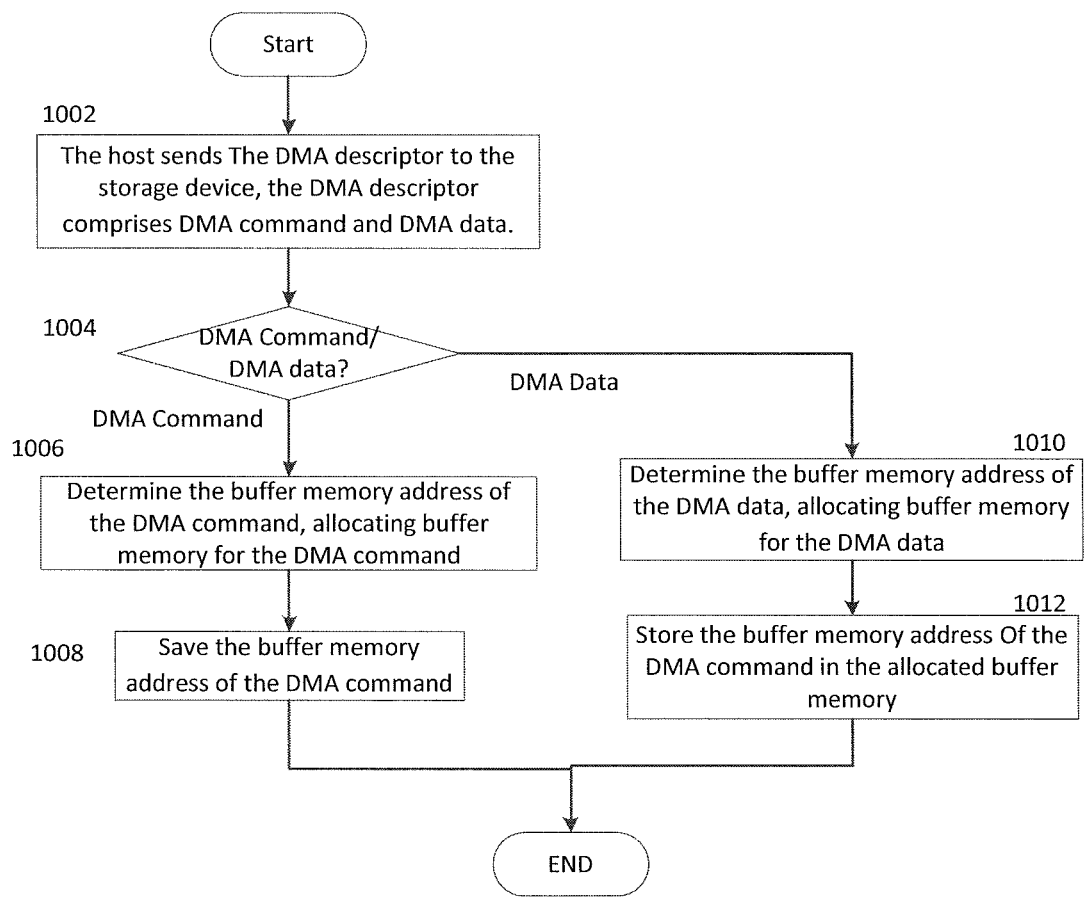
FIG. 10A is a flow chart of creating linked list in the buffer memory of the storage device according to an embodiment of the present invention.

FIG. 10A is a flow chart of creating the linked list in the buffer memory of the storage device according to the embodiment of the invention. In the process of processing DMA descriptor 600 in storage device disclosed in FIG. 7A-7C, the DMA descriptor 600 is converted into one or more microinstructions. In a further embodiment, in order to effectively process the relationship (for example, the microinstructions are all associated to the DMA descriptor 600) between the one or more microinstructions, the storage device 102, in response to the DMA descriptor 600 transmitted by the host 101, will create a linked list in the buffer memory 106, with which the multiple microinstructions corresponding to the same DMA descriptor 600 will be associated.

As shown in FIG. 10A, in step 1002, the host 101 sends the DMA descriptor 600 to the storage device 102. The DMA descriptor 600 includes the DMA command 610 and the DMA data 620, 630. It has been combining with FIGS. 9A and 9B above to describe the example of the process of the host 101 sending the DMA descriptor 600 to the storage device 102. It should also be aware that creating the linked list in the buffer memory of the storage device will contribute to the execution of the IO operations by the storage device, especially the concurrent/out-of-order execution of the multiple IO operations, and the multiple IO operations can be linked together by accessing the linked list of each other. Thus the IO operations without associations can be executed concurrently in the storage device. As a result, it can also respond to other types of IO commands or other commands except the DMA command, in order to create a linked list in the storage device.

In step 1004, it determines whether the DMA command 610 or the DMA data 620, 630 is received.

If the DMA command 610 is received, in step 1006, it will extract the buffer memory address used for the DMA command 610 from the buffer memory address field 610, and basing on the buffer memory address, allocate storage space for the DMA command 610 in the buffer memory 106. Next, in step 1008, the buffer memory address allocated for the DMA command 610 will be saved, which is used for allocate the buffer memory address for the DMA data 620, 630.

If it determines that the one received in step 1004 is the DMA data 620, then in step 1010, it will extract the buffer memory address used for the DMA data 620 from the buffer memory address field 622 of the DMA data 620, and basing on the buffer memory address, allocate storage space for the DMA command 620 in the buffer memory 106. And in step 1012, in the storage space allocated for the DMA command 620 in the buffer memory 106, the buffer memory address of the DMA command 610 stored in step 1008 will be stored. Thus, in the buffer memory 106, the storage space allocated for the DMA command 610 and the DMA data 620 will form a linked list, of which the storage space allocated for the DMA command 610 is the head node of the linked list, and the storage space allocated for the DMA data 620 is linked to the head node of the linked list.

In the case of the DMA descriptor 600 also including the DMA data 630, through steps 1010 and 1012, basing on the buffer memory address 632 in the DMA data 630, the storage space is allocated for the DMA data 630 in the buffer memory 106, and in the storage space allocated for the DMA data 630 in the buffer memory, the buffer memory address of the DMA command 610 will be stored. Person skilled in the technical field will be aware that it can also store the buffer memory address used for the DMA data 620 in the storage space allocated for the DMA data 630 in the buffer memory 106, so that different types of linked lists will be formed. In other examples, the storage space allocated for the DMA command 610 and the DMA data 620, 630 in the buffer memory 106 will be created as a circular list or double linked list.

It has been described above combined with FIG. 7A, 7B, 7C that the storage device 102 generates the DMA microinstructions basing on the DMA data (620, 630), and stores them in the microinstruction FIFO 733. The operation of generating the DMA microinstructions from the DMA data (620, 630) can occur after step 1012, and the buffer memory address allocated for the DMA data (620, 630) is carried in the DMA microinstructions.

Figure 10B:
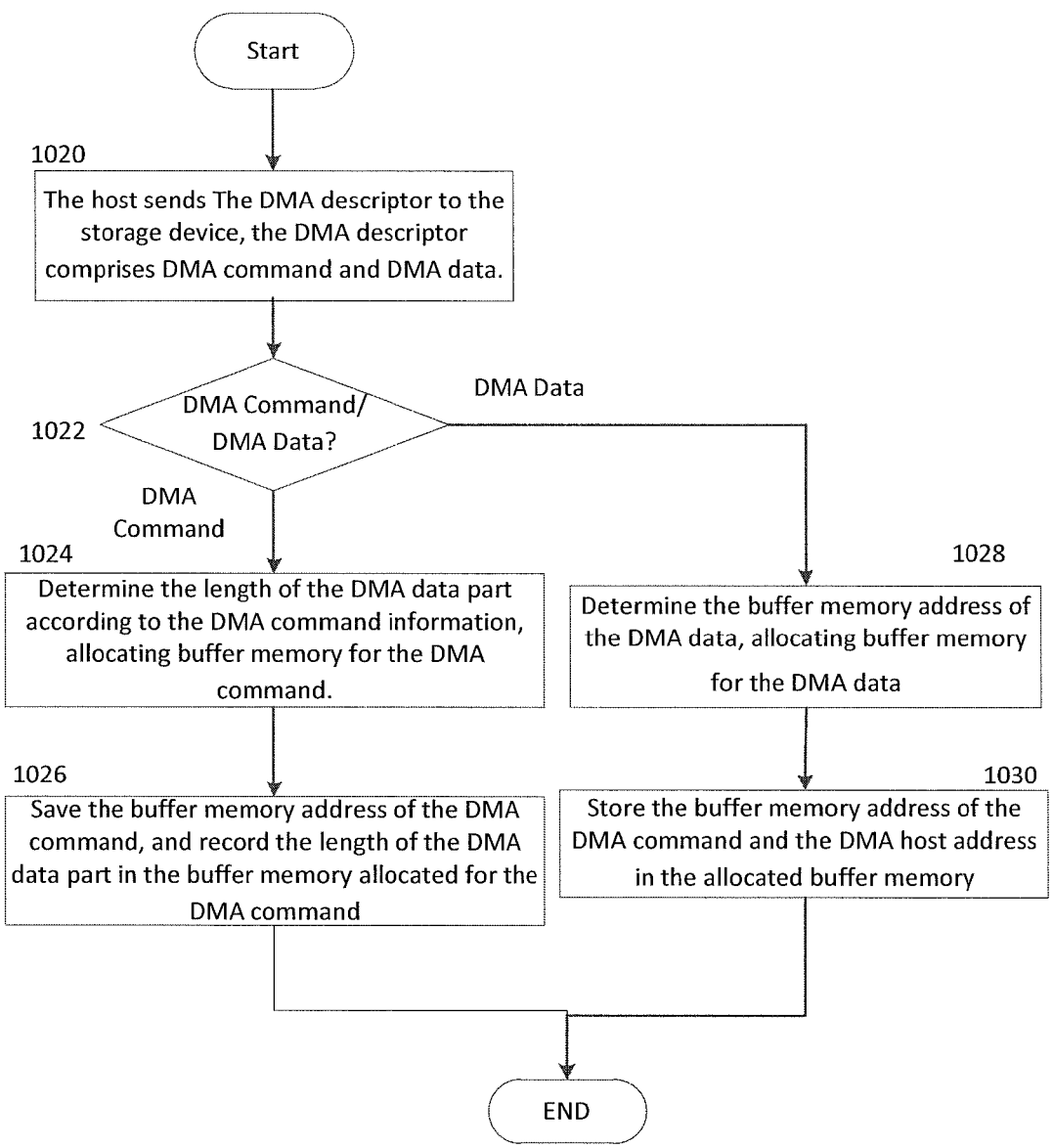
FIG. 10B is a flow chart of creating linked list in the buffer memory of the storage device according to an embodiment of the present invention.
Figure 10C:
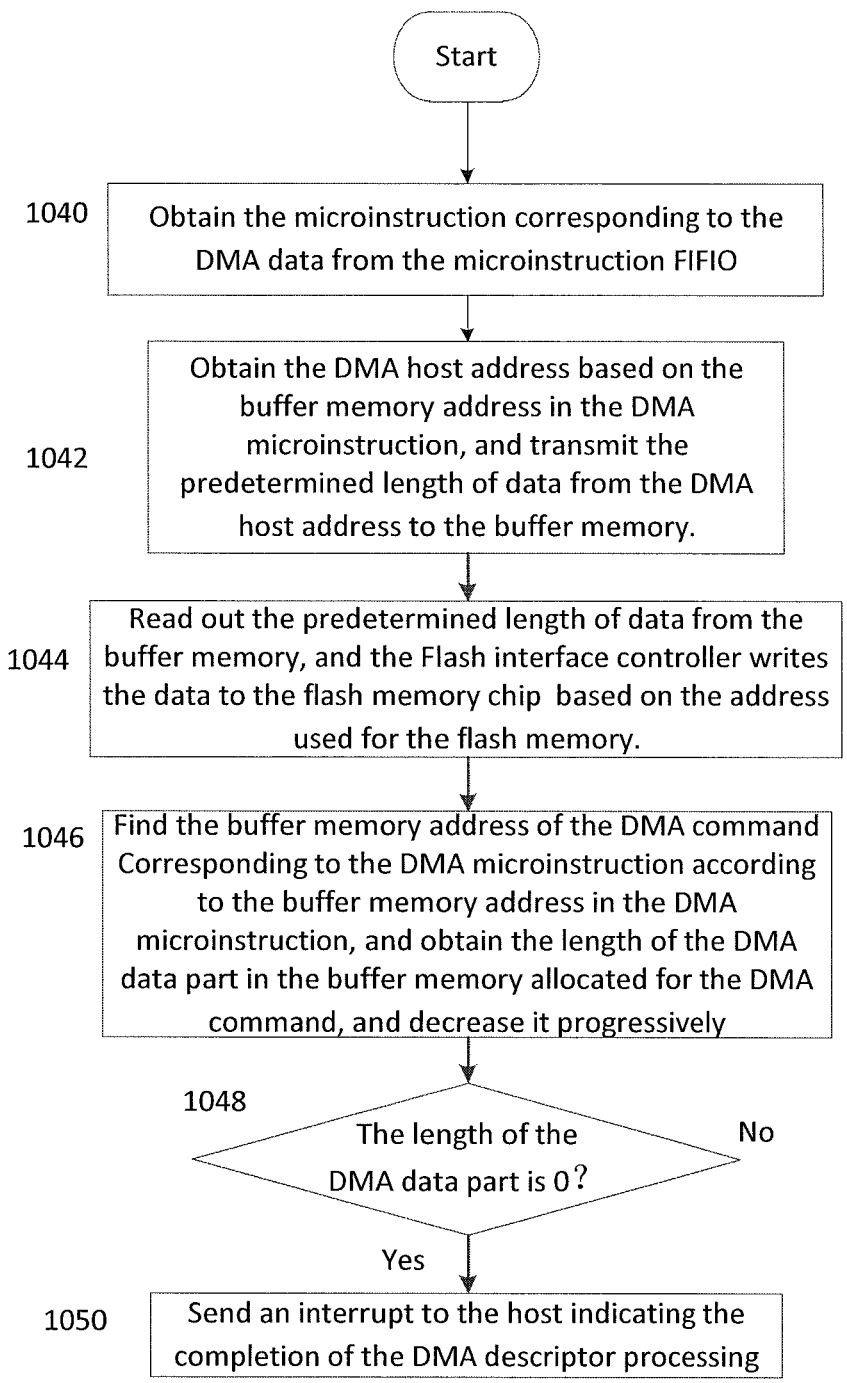
FIG. 10C is a flow chart of the storage device using the created linked list in the buffer memory for executing the DMA descriptors according to an embodiment of the present invention.

FIG. 10B is the flow chart of creating linked lists in the buffer memory of the storage device according to the embodiment of the present invention. Compared with the embodiment provided in FIG. 10A, the embodiment in FIG. 10B, will also store the information related to the processing or execution of the DMA descriptors in the created linked list. FIG. 10C is the flow chart of the storage device using the linked list created in the buffer memory to execute the DMA descriptor according to the embodiment of the present invention. FIG. 11A-11F shows multiple states of the buffer memory associated with FIG. 10B and FIG. 10C. In FIG. 11A-11F, 1100 indicates the storage space in the buffer memory 106.

Specifically, in step 1020, the host 101 sends the DMA descriptor 600 to the storage device 102.

In step 1022, it determines whether the received command is the DMA command 610 or DMA data 620, 630.

Figure 11A:
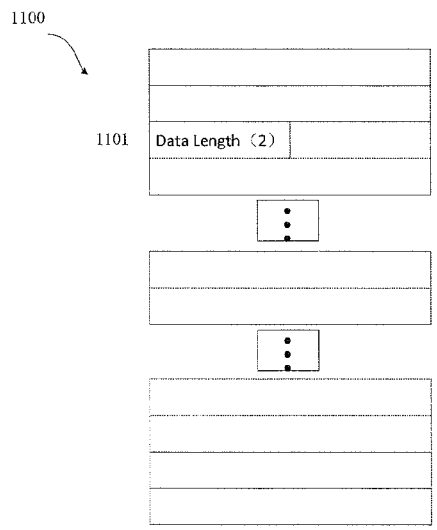
FIG. 11A-11F shows a variety of status of the buffer memory related to FIG. 10B, FIG. 10C.

If the DMA command 610 is received, in step 1024, it will extract the buffer memory address from the buffer memory address field 610, and basing on the buffer memory address, allocate storage space for the DMA command 610 in the buffer memory 106. As illustrated in FIG. 11A, the storage space 1101 is allocated for the DMA command 610. And also the DMA descriptor length field 613 is extracted from the DMA command 610, and the DMA data part length of the DMA descriptor 600 can be obtained from the DMA descriptor length 613 (e.g., the DMA descriptor length minus 1). Next, in step 1026, the buffer memory address allocated for the DMA command 610 is saved, for allocating buffer addresses for the DMA data 620, 630. And, the DMA data part length is recorded in the buffer memory allocated for the DMA command 610. As illustrated in FIG. 11A, the DMA data part length is saved in the storage space 1101 (in this example, the DMA data part length is 2).

Figure 11B:
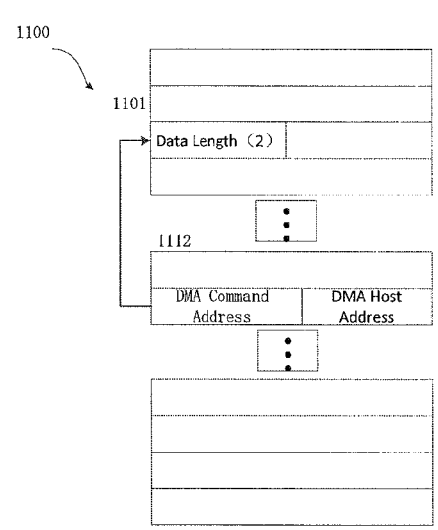

If it determines that the one received in step 1022 is the DMA data 620, then in step 1028, it will extract the buffer memory address used for the DMA data 620 from the buffer memory address field 622 of the DMA data 620, and basing on the buffer memory address, allocate storage space for the DMA command 620 in the buffer memory 106. As illustrated in FIG. 11B, the storage space 1112 is allocated for the DMA data 620. And in step 1030, in the storage space 1112 allocated for the DMA command 620, the buffer memory address of the DMA command 610 stored in step 1026 will be stored. Thus, in the buffer memory 106, the storage space (1101 and 1112) allocated for the DMA command 610 and the DMA data 620 will form a linked list, of which the storage space 1101 allocated for the DMA command 610 is the head node of the linked list, and the storage space 1112 allocated for the DMA data 620 is linked to the head node of the linked list. Also the DMA host address corresponding to the DMA data 620 is stored in the storage space 1112.

In the case of the DMA descriptor 600 also including the DMA data 630, through steps 1028 and 1030, basing on the buffer memory address 632 in the DMA data 630, the storage space 1123 is allocated for the DMA data 630 in the buffer memory 106 (referring to FIG. 11C), and in the storage space 1123, the buffer memory address of the DMA command 610 will be stored. And the DMA host address corresponding to the DMA data 630 is also stored in the storage space 1123.

As a result, in the buffer memory 106, a linked list corresponding to the DMA descriptor 600 is formed, of which the storage space 1101 is the head node of the linked list, and the storage space 1112 and 1123 are the nodes pointing to the head node of the linked list. Person skilled in the technical field will be aware that it can also store the buffer memory address used for the DMA data 620 in the storage space 1123 allocated for the DMA data 630 in the buffer memory 106, so that different types of linked lists will be formed. In other examples, the storage space allocated for the DMA command 610 and the DMA data 620, 630 in the buffer memory 106 will be created into a circular list or double linked list.

FIG. 10C is the flow chart of the storage device using the linked list created in the buffer memory to execute the DMA descriptor according to the embodiment of the present invention. It has been described above combined with FIG. 7A, 7B, 7C that the storage device 102 generates the DMA microinstructions basing on the DMA data (620, 630), and stores them in the microinstruction FIFO 733. During the execution of the DMA microinstructions by the storage device 102, in one example, the linked list in the buffer memory 106 is used. The DMA microinstruction includes the buffer memory address, through which it can obtain the storage space in the buffer memory 106 allocated by the DMA data corresponding to the DMA microinstruction, and then it can obtain the DMA host address corresponding to the DMA data and the DMA data part length or the DMA data number in the DMA descriptor corresponding to the DMA data.

It is described in the following, that the DMA microinstruction corresponding to the DMA data 620 will be indicated with the first DMA microinstruction, and the DMA microinstruction corresponding to the DMA data 630 will be indicated with the second DMA microinstruction.

In step 1040, the first DMA microinstruction is obtained from the microinstruction FIFO 733.

In step 1042, the first DMA microinstruction includes the address of the storage space 1112 of the buffer memory 106 allocated for the DMA data 620, and obtains the DMA host address from the storage space 1112. The DMA host address is provided by the DMA host address field 621 in the DMA data 620. Basing on the DMA host address, it will execute the DMA transmission between the host 101 and the storage device 102, transmitting a predetermined length (e.g., 4 KB) of data in the DMA host address of the host 101 to the buffer memory of the storage device 102 by way of DMA transmission. For the second DMA microinstruction, similar operation will be executed, transmitting the host 101's data in the DMA host address provided by the DMA host address field 632 of the DMA data 630 to the storage space 1123 allocated for the DMA data 632 in the buffer memory of the storage device 102 by way of DMA transmission. In FIG. 11D, it shows the storage space 1112 and 1123 storing the data transmitted by way of DMA transmission after the execution of the first DMA microinstruction and second DMA microinstruction.

In step 1044, it continues to the execute the first DMA microinstruction. Through the address of the storage space 1112 in the first DMA microinstruction, a predetermined length of data is removed from the storage space, which data is transmitted in step 1042 from the host 101 to the storage space 1112 of the buffer memory 106 by way of DMA operation. And through the flash interface controller (for example, Flash interface controller 737 in FIG. 7C) the data is written to the flash memory chip 105 basing on the address used for the flash memory included in the first DMA microinstruction. The address used for the flash memory is obtained through the storage device logic address field 612 in the DMA command 610. The second DMA microinstruction will be executed in a similar way. Through the address of the storage space 1123 included the second DMA microinstruction, a predetermined length of data is removed from the storage space, and through the flash interface controller the data is written to the flash memory chip 105 basing on the address used for the flash memory included in the second DMA microinstruction. The address used for the flash memory included in the second DMA microinstruction, is obtained through the storage device's logic address field 612 in the DMA command 610 plus a predetermined value (for example the length of data corresponding to the DMA transmission, which is 4 KB in this example). In one example, the storage device's logical address in the DMA command 610 is converted into the storage device's physical address, and the data is written to the flash memory chip 105 basing on the physical address. The mapping process from the storage device's logical address to physical address, should be well known by person skilled in the technical field.

In step 1046, it continues to execute the first DMA microinstruction. The address of storage space 1101 allocated for the DMA command 610 is obtained through the address of the storage space 1112 in the first microinstruction, and the length of DMA data part is obtained in the storage space 1101, and the length of the DMA data part stored in the storage space 1101 is decreased progressively (for example, minus 1 or minus the unit length). As illustrated in FIG. 11E, as for the first DMA microinstruction, after the length of the DMA data part is decreased progressively, its value is changed from 2 to 1. And the address of the storage space 1101 is no longer saved in the storage space 1112, to indicate the completion of executing the DMA data 620. In step 1048, as the length of the DMA data part is not 0, it means that the DMA descriptor 600 operation is not completed, because it also contains another DMA data 630, at this time, with no further processing.

When the second DMA microinstructions is being executed in step 1046, through the address of the storage space 1123 in the second DMA microinstruction, the address of storage space 1101 allocated for the DMA command 610 is obtained, and the length of DMA data part is obtained in the storage space 1101, and the length of the DMA data part stored in the storage space 1101 is decreased progressively (for example, minus 1 or minus the unit length). As illustrated in FIG. 11F, as for the second DMA microinstruction, after the length of the DMA data part is decreased progressively, its value is changed from 1 to 0. And the address of the storage space 1101 is no longer saved in the storage space 1123, to indicate the completion of executing the DMA data 630.

At this moment, When the second DMA descriptor is being executed in step 1048, as the length of the DMA data part is 0, it means that the DMA descriptor 600 operation has been completed. Next, in step 1050, an interrupt is sent to the host 101, to indicate that the operation of the DMA descriptor 600 has been completed.

Again as illustrated in FIG. 11F, the address of storage space 1101 is no longer saved in either of the storage space 1112 and 1123. The length of the DMA data part in the storage space 1101 is 0. In this case, it means that the DMA descriptor 600 execution has been completed, and the storage space 1101, 1112 and 1123 will not be used again, the storage space of which can be released for other DMA descriptor execution. In one example, the release and reuse of the corresponding storage space is controlled by the host 101, it has been combined with FIGS. 9A and 9B above to described the release of the storage space in the IO request linked list 801. As the storage units (411, 412 . . . 41N) in the buffer control block 406 are corresponding to the storage spaces in the buffer memory 106, the release of the storage space in the IO request linked list 801 means that the storage spaces 1101, 1112 and 1123 in the buffer memory are released.

It has been described above combined with FIG. 10B, 10C, 11A-11F the scheme of storing the DMA host addresses corresponding to the first and second microinstructions in the buffer memory 106, which makes the DMA microinstructions not have to carry the DMA host address and reduces the occupation of the circuit resources, and associates the first, second DMA microinstructions corresponding to the same DMA descriptor 600 through the buffer memory 106. Person skilled in the technical field will be aware that the storage device's logical address and/or the DMA host address corresponding to the first and second microinstructions can also be stored in the buffer memory, so as to further reduce the length of the DMA microinstruction and the occupation of the circuit resources.

Figure 12:
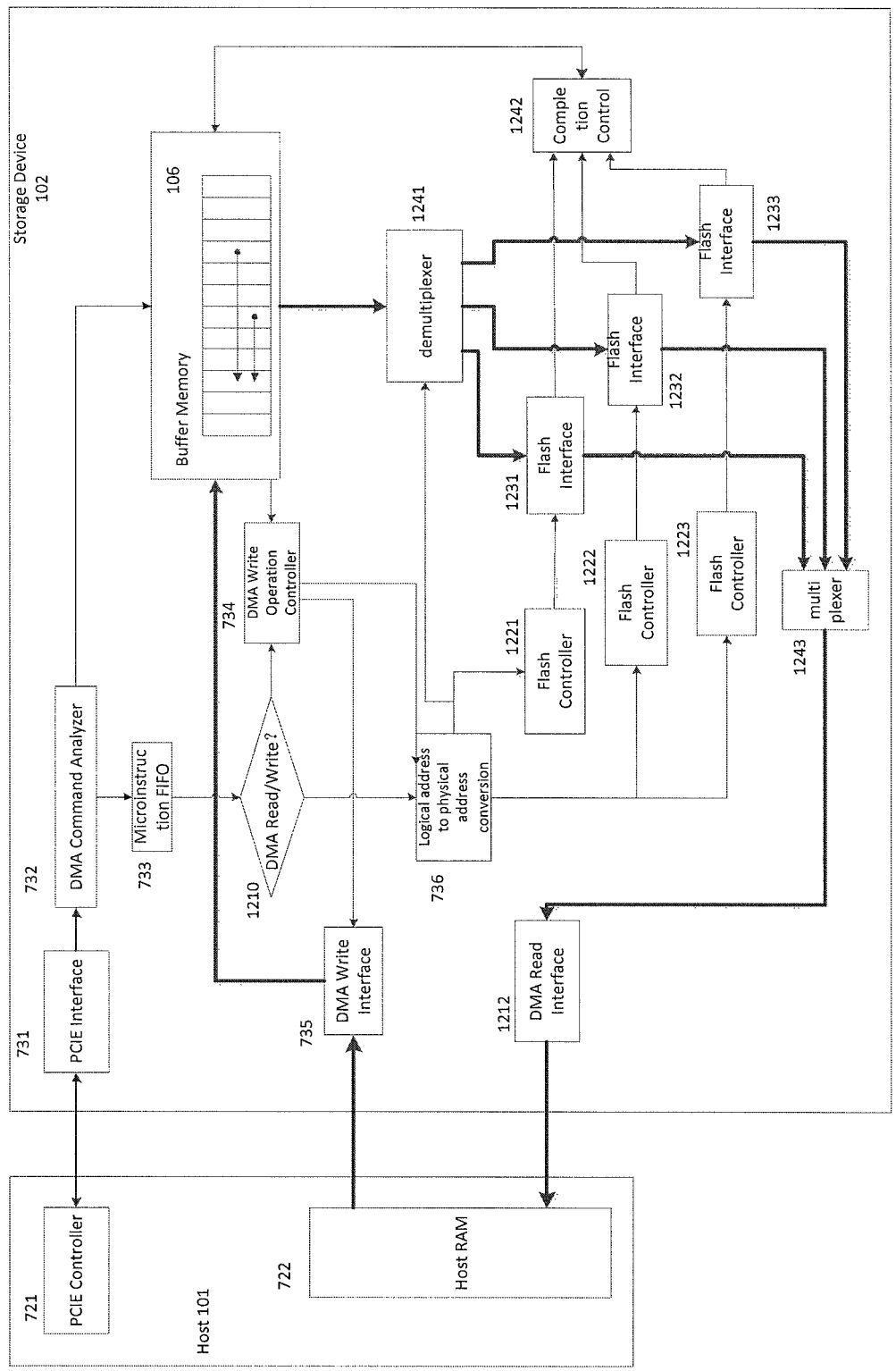
FIG. 12 is a hardware block diagram of the storage device according to another embodiment of the invention.
Figure 13:
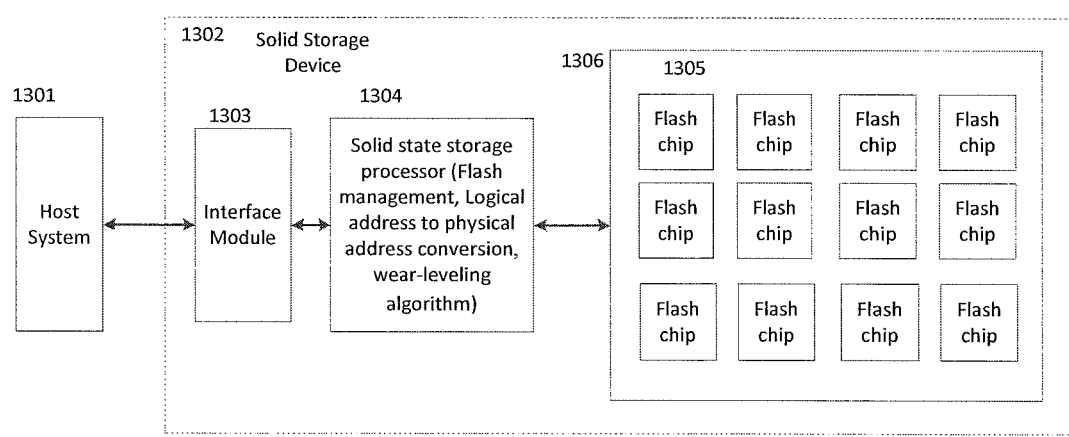
FIG. 13 is a block diagram of a solid state storage device in the prior art.

FIG. 12 is the hardware block diagram of the storage device according to another embodiment of the invention. Similar to which is disclosed in FIG. 7C, the host 101 includes a PCIE controller 721 and a host memory 722. The storage device 102 includes a PCIE interface 731, a DMA command analyzer 732, a microinstruction FIFO buffer 733, a DMA write operation controller 734, a DMA write interface 735, the logical address to physical address conversion circuit 736 and a buffer memory 106. The storage device 102 also includes a DMA read-write microinstruction judging circuit 1210, a DMA read interface 1212, flash controllers 1221, 1222, 1223, flash memory interfaces 1231, 1232, 1233, completion control circuit 1242, a demultiplexer 1241 and a multiplexer 1243. The flash memory interfaces 1231, 1232, 1233 are coupled to the flash memory chip 105.

The PCIE interface 731 receives the DMA descriptor 600 sent by the host 101 through the PCIE controller 721. The connection between the host 101 and the storage device 102 is not limited to PCIE. The DMA command analyzer 732 converts the DMA descriptor 600 received by the PCIE interface 731 into the DMA microinstruction. As to the DMA descriptor 600 shown in FIG. 6, the DMA command analyzer will convert it into the first DMA microinstruction corresponding to the DMA data 620 and the second DMA microinstruction corresponding to the DMA data 630. In one example, the first and second DMA microinstructions respectively include the field indicating the microinstruction types (read/write/erase/other), the field indicating the addresses of the corresponding storing units in the buffer memory 106, and the field indicating the logical addresses of the storage device.

Figure 11C:
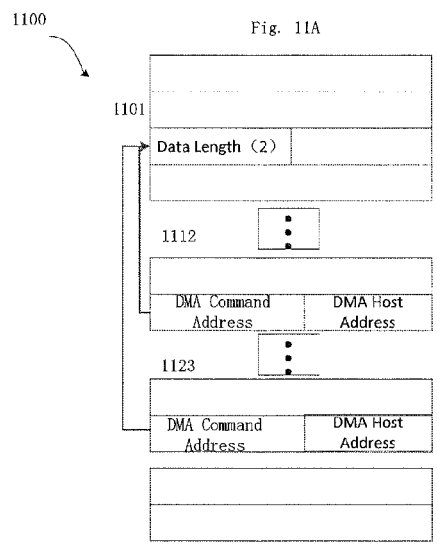
Figure 11D:
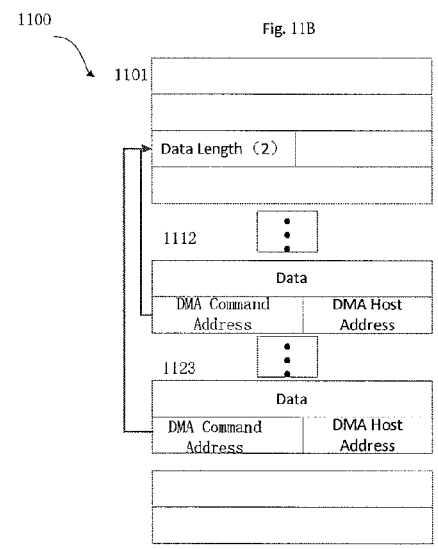
Figure 11E:
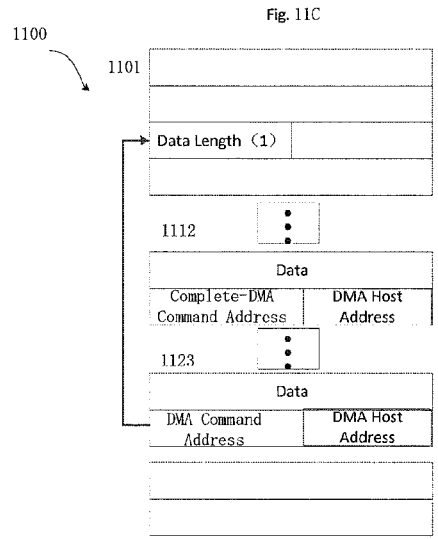
Figure 11F:
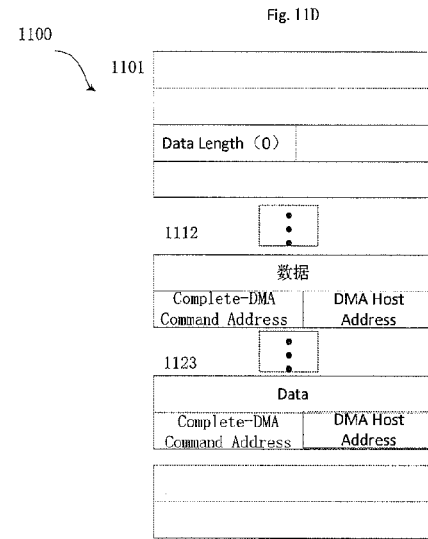

As illustrated in FIG. 10B and FIG. 11C, the DMA command analyzer 732 also allocates the storage units in the buffer memory 106 for the DMA command 610, and stores the length of the DMA data part in it. The DMA command analyzer also allocates the storage units in the buffer memory 106 for the DMA command 620, and stores the storage unit addresses allocated for the DMA command 610 and the DMA host address in the DMA data 630 in it.

The DMA command analyzer 732 will store the first DMA microinstruction and second DMA microinstruction in the microinstruction FIFO 733.

The microinstruction FIFO 733 can cache the DMA microinstructions, and provide DMA microinstructions to the DMA read-write microinstruction judging circuit 1210 according to the First-In-First-Out mode.

In the DMA read-write microinstruction judging circuit 1210, the type of the DMA microinstruction will be determined. For the DMA microinstructions corresponding to the DMA write operation, for example, the first DMA microinstruction and second DMA microinstruction mentioned above, the DMA write operation controller 734 will execute the DMA write operation basing on these DMA microinstructions. The DMA write operation controller 734 uses the fields in the first. DMA microinstruction indicating the storage unit addresses in the buffer memory 106 corresponding to the first DMA microinstruction, to obtain the DMA host address from the buffer memory 106, and to initiate write operations through the DMA write interface 735 between the host 101 and the storage device 102, and to transmit the data stored in the DMA host address to the storage unit of the buffer memory 106 corresponding to the first DMA microinstruction, of which the data transmitted can have a predetermined length (e.g. 4K bytes). For the second DMA microinstruction, the DMA write operation controller 734 uses the fields in the second DMA microinstruction indicating the storage unit addresses in the buffer memory 106 corresponding to the second DMA microinstruction, to obtain the DMA host address from the buffer memory 106, and to initiate write operations through the DMA write interface 735 between the host 101 and the storage device 102, and to transmit the data stored in the DMA host address to the storage unit of the buffer memory 106 corresponding to the second DMA microinstruction.

The logical addresses used for the respective storage device will be obtained from the fields, indicating the logic address of the storage device, of the first DMA microinstruction and second DMA microinstruction. In the logical address to physical address conversion circuit 736, it will convert the storage device's logical addresses of each DMA microinstructions into physical addresses used for the flash memory chips 105. For each DMA microinstruction, the Flash controller 1221, 1222, 1223, basing on the physical address provided by the logical address to physical address conversion circuit 736, will write the data written in the buffer memory 106 to the flash memory chip 105 through the flash memory interface 1231, 1232, 1233, among which, the Flash controller 1221 is coupled to the flash interface 1231, the Flash controller 1222 is coupled to the flash interface 1232, the Flash controller 1223 is coupled to the flash interface 1233. And the flash memory interfaces 1231, 1232, 1233 are respectively coupled to their flash memory chips. Thus for the physical address used for the flash memory chips 105 which is converted from the logical address of the storage device in the DMA microinstruction, the physical address indicates a specific flash chip, which is coupled to a specific one of the flash memory interface 1231, 1232, 1233. Therefore, basing on the physical address, it can be determined which of the flash memory interfaces 1231, 1232, 1233 can be used to write the data to the flash memory chips, and also which of the Flash controller 1221, 1222, 1223 can be used. The flash memory interface 1231, 1232, 1233 can also be coupled to the buffer memory through the demultiplexer 1241. Basing on the physical address, the demultiplexer 1241 can transmit the data from the buffer memory to a specific one of the flash memory interface 1231, 1232, 1233.

After the flash memory interface 1231, 1232, 1233 writing data to the flash memory chip 105, the completion control circuit 1242 accesses to the buffer memory 106 basing on the fields in the first and second DMA microinstructions indicating the storage unit addresses in the corresponding buffer memory 106, and further accesses the storage unit allocated for the DMA commands 610 in the buffer memory, to obtain the length of the DMA data part, and decrease it progressively (e.g., minus 1 or minus unit length). Thus, when the length of the DMA data part of the storage unit allocated for the DMA command 610 is 0, it means that the DMA descriptor 600 operation is completed. Then, an interrupt can be sent to the host, to indicate the completion of the DMA descriptor 600 operation.

Although in FIG. 12 by way of examples it shows embodiments including three Flash controller 1221, 1222, 1223 and three flash memory interface 1231, 1232, 1233, Person skilled in the technical field will be aware that multiple different number of flash controllers and flash memories can be used to match the number of the flash memory chips.

For the DMA microinstructions corresponding to the DMA read operation, the DMA read-write microinstruction judging circuit 1210 will transmit it directly to the logical address to physical address conversion circuit 736, and obtain the physical address used for the flash memory chip 105. The Flash controller 1221, 1222, 1223, basing on the physical address, will read out the data from the flash memory chip 105 through the flash memory interfaces 1231, 1232, 1233. And basing on the fields in the DMA microinstructions indicating the storage unit addresses in the corresponding buffer memory 106, it obtains the DMA host address from the buffer memory 106 corresponding to the DMA microinstruction, and initiates the DMA transmission through the DMA read interface 1212 between the host 101 and the storage device 102, transmitting the read data to the position indicated by the DMA host address in the host RAM 722 in the host 101. The flash memory interface 1231, 1232, 1233 are coupled to the DMA read interface via the multiplexer 1243, so that the data obtained from the flash memory interface 1231, 1232, 1233 can be transmitted to the host RAM 722 via the DMA read interface 1212. When the flash memory interfaces 1231, 1232, 1233 read out data from the flash memory chip 105, the completion control circuit 1242 accesses to the buffer memory 106 still basing on the fields in the DMA microinstructions indicating the storage unit addresses in the corresponding buffer memory 106, and further obtains the length of the DMA data part, and decrease it progressively (e.g., minus 1 or minus unit length). Thus, when the length of the DMA data part becomes 0, it means that the DMA descriptor 600 operation is completed. Then, an interrupt can be sent to the host, to indicate the completion of the DMA descriptor operation.

In the storage devices disclosed in FIG. 12, multiple concurrent operation to the DMA descriptor 600 can be supported. For each of the multiple DMA descriptors 600, through the linked list created in the buffer memory 106, the DMA data corresponding to the same DMA descriptor 600 are associated together, so that the sequence of operations to the multiple DMA microinstructions becomes unimportant.

It has been described in details above the execution of data write operation by the storage device or the DMA descriptors related to the write operation. Obviously, the execution of the read operation by the storage device can also benefit from this invention. For example, the flash chip address and buffer memory address both can be specified in the read command, and use the buffer memory as the buffer for the readout data. It can also describe the buffer memory address in the DMA descriptor associated with the read operation. After the data is read from the flash memory chip, the buffer memory can be used as a cache for the readout data.

It has shown the description of the present invention for the purpose of describing and presenting, but not limiting the invention to the disclosed form. Many adjustments and changes are obvious to Person skilled in the technical field.

What that is claimed is:

1. A method of writing data to a storage device, wherein the storage device includes a buffer memory and a flash memory, and the storage device and an information processing device are communicably connected, the method comprising:
   receiving, from the information processing device, a first DMA descriptor including an address of a memory location in the information processing device, an address of the flash memory, and an address of the buffer memory;
   when the first DMA descriptor indicates a DMA write operation;
   writing, by DMA transmission, first data from the address of the memory location in the information processing device to the buffer memory at the address of the buffer memory; and
   writing the first data from the address of the buffer memory to the flash memory based on the address of the flash memory.

2. The method of claim 1, wherein the first DMA descriptor includes a first DMA descriptor command and a first DMA descriptor data, wherein the first DMA descriptor data includes the address of the memory location in the information processing device and the address of the buffer memory, and the first DMA descriptor command includes the address of the flash memory;
   the method further comprising:
   converting the first DMA descriptor data into a first DMA microinstruction indicating the address of the flash memory, the address of the memory location in the information processing device and the address of the buffer memory;
   wherein, when the first DMA microinstruction indicates the DMA write operation, based on the address of the memory location in the information processing device and the address of the buffer memory, the first data is written to the buffer memory from the information processing device by the DMA transmission; and
   based on the address of the flash memory and the address of the buffer memory, the first data in the buffer memory is written to the flash memory.

3. The method of claim 1, wherein the first DMA descriptor includes a first DMA descriptor command, a first DMA descriptor data and a second DMA descriptor data, the first DMA descriptor data includes a first address of a first memory location in the information processing device and a first address of the buffer memory, the second DMA descriptor data includes a second address of a second memory location in the information processing device and a second address of the buffer memory, wherein the first DMA descriptor command includes the address of the flash memory;

the method further comprising:
converting the first DMA descriptor data into a first DMA microinstruction, and converting the second DMA descriptor data into a second DMA microinstruction, wherein the first DMA microinstruction indicates the first addresses of the flash memory, the first addresses of the first memory location in the information processing device and the first addresses of the buffer memory, and the second microinstruction indicates the second address of the flash memory, the second address of the second memory location in the information processing device, and the second address of the buffer memory, wherein the second address of the flash memory and the first address of the flash memory are apart from each other at a predetermined offset value;

wherein, when the first DMA descriptor indicates the DMA write operation, based on the first address of the first memory location in the information processing device and the first address of the buffer memory, the first data is written to the buffer memory from the information processing device by DMA transmission;

when the second DMA descriptor indicates the DMA write operation, based on the second address of the second memory location in the information processing device and the second address of the buffer memory, the second data is written to the buffer memory from the information processing device by DMA transmission;

based on the first address of the flash memory and the first address of the buffer memory, the first data in the buffer memory is written to the flash memory; and based on the second address of the flash memory and the second address of the buffer memory, the second data in the buffer memory is written to the flash memory.

4. The method of claim 1, wherein:
after the first data is written to the flash memory, a message is sent to the information processing device, to indicate the releasing of the storage space of the buffer memory corresponding to the address of the buffer memory.

5. The method of claim 1, wherein:
after the first data is written to the buffer memory, a message is sent to the information processing device, to indicate the completion of the first DMA descriptor operation.

6. The method of claim 3, wherein:
after the first data and the second data are written to the flash memory, an interrupt is sent to the information processing device, to indicate that the memory space of the buffer memory corresponding to the first address of the buffer memory and the second address of the buffer memory is released.

7. The method of claim 3, wherein:
when the first data and the second data are written to the buffer memory, a message is sent to the information processing device, to indicate the completion of the first DMA descriptor operation.

8. A storage device, including a buffer memory, a flash memory, an information processing device interface and a control circuit, is communicably connected with an information processing device, wherein:
the information processing device interface receives a first DMA descriptor from the information processing device, wherein the first DMA descriptor includes an address of a memory location in the information processing device, for an address of the flash memory, and an address of the buffer memory;
when the control circuit identifies the first DMA descriptor indicating a DMA write operation, the first data is written to the buffer memory at the address of the buffer memory from the address of the memory location in the information processing device by DMA transmission; and
the first data from the address of buffer memory is written to the flash memory based on the address of the flash memory by the control circuit.

9. A method for writing data to a storage device, wherein the storage device includes a buffer memory and a flash memory, and is communicably connected with an information processing device, the method comprising:
receiving, from the information processing device, a first write command including data to be written, an address of the flash memory and an address of the buffer memory;
in response to the first write command:
writing the data to be written to the buffer memory at the address of the buffer memory; and
writing the data to be written from the address of the buffer memory to the flash memory based on the address of the flash memory.

10. The method of claim 9, wherein after writing the data to be written to the buffer memory, a message is sent to the information processing device, to indicate the completion of the first write command operation.

11. The method of claim 9, wherein after writing the data to be written to the flash memory, a message is sent to the information processing device, to indicate the releasing of the storage space of the buffer memory corresponding to the address of the buffer memory.

12. The method of claim 9, wherein after writing the data to be written to the flash memory, a message is sent to the information processing device, to indicate that the first write command operation is completed and the memory space of the buffer memory corresponding to the address used for the buffer memory is released.

13. A storage device, including a buffer memory, a flash memory, an information processing device interface, and a control circuit, is communicably connected with an information processing device, wherein:
the information processing device interface receives a write command from the information processing device, wherein the write command includes data to be written, an address of the flash memory, and an address of the buffer memory; wherein
the control circuit, in response to the write command:
writes the data to be written to the buffer memory at the address of the buffer memory; and
writes the data to be written from the address of the buffer memory to the flash memory based on the address of the flash memory.

14. The method of claim 2, wherein:
after the first data is written to the flash memory, a message is sent to the information processing device, to indicate the releasing of the storage space of the buffer memory corresponding to the address of the buffer memory.

15. The method of claim 2, wherein:
after the first data is written to the buffer memory, a message is sent to the information processing device, to indicate the completion of the first DMA descriptor operation.

16. The method of claim 4, wherein:
after the first data is written to the buffer memory, a message is sent to the information processing device, to indicate the completion of the first DMA descriptor operation.

17. The method of claim 14, wherein:
after the first data is written to the buffer memory, a message is sent to the information processing device, to indicate the completion of the first DMA descriptor operation.

18. The method of claim 6, wherein:
when the first data and the second data are written to the buffer memory, a message is sent to the information processing device, to indicate the completion of the first DMA descriptor operation.

19. The method of claim 10, wherein after writing the data to be written to the flash memory, a message is sent to the information processing device, to indicate the releasing of the storage space of the buffer memory corresponding to the address of the buffer memory.

* * * * *